US011290187B2

(12) United States Patent
Smith

(10) Patent No.: US 11,290,187 B2
(45) Date of Patent: Mar. 29, 2022

(54) RF TRANSPORT NETWORK

(71) Applicant: CommScope Technologies LLC, Hickory, NC (US)

(72) Inventor: Trevor D. Smith, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 14 days.

(21) Appl. No.: 16/036,505

(22) Filed: Jul. 16, 2018

(65) Prior Publication Data

US 2018/0343641 A1 Nov. 29, 2018

Related U.S. Application Data

(63) Continuation of application No. 13/939,392, filed on Jul. 11, 2013, now abandoned.

(Continued)

(51) Int. Cl.
*H04B 10/2575* (2013.01)
*H04W 72/04* (2009.01)
(Continued)

(52) U.S. Cl.
CPC .... *H04B 10/25754* (2013.01); *H04J 14/0227* (2013.01); *H04J 14/0256* (2013.01);
(Continued)

(58) Field of Classification Search
CPC ........................................ H04B 10/2575–2587
See application file for complete search history.

(56) References Cited

U.S. PATENT DOCUMENTS 7,089,420 B1  8/2006 Durst et al.
7,286,507 B1 10/2007 Oh et al.
(Continued)

FOREIGN PATENT DOCUMENTS

CN  101400187 A  4/2009
EP   2144388 A2  1/2010
(Continued)

OTHER PUBLICATIONS

European Patent Office, "Extended European Search Report from EP Application No. 13817139.2 dated Feb. 2, 2016", from Foreign Counterpart to PCT Application No. PCT/US2013/50008, dated Feb. 2, 2016, pp. 1-9, Published: EP.

(Continued)

*Primary Examiner* — Nathan M Cors
(74) *Attorney, Agent, or Firm* — Fogg & Powers LLC

(57) ABSTRACT

In one embodiment, a host-to-host network comprises: first host units (HUs) located at a first end and configured to output optical output signals and receive optical input signals; second HUs located at a second end and configured to output optical output signals and receive optical input signals; a first optical WDM configured to combine the first HU optical output signals and output a corresponding first combined output over a first fiber; a second optical WDM configured to receive the first combined output and demultiplex the optical output signals and provide them as optical input signals for the second HUs; the second optical WDM configured to combine second HU optical output signals and output a corresponding second combined output over a second fiber; the first optical WDM configured to receive the second combined output and demultiplex the optical output signals and provide them as optical input signals for the first HUs.

23 Claims, 8 Drawing Sheets

Related U.S. Application Data

(60) Provisional application No. 61/670,482, filed on Jul. 11, 2012.

(51) Int. Cl.
*H04J 14/02* (2006.01)
*H04W 12/069* (2021.01)
*H04W 88/08* (2009.01)

(52) U.S. Cl.
CPC ....... *H04J 14/0278* (2013.01); *H04W 12/069* (2021.01); *H04W 72/04* (2013.01); *H04W 88/085* (2013.01)

(56) References Cited

U.S. PATENT DOCUMENTS

| | | | |
|---|---|---|---|
| 2002/0131685 A1* | 9/2002 | He | G02B 6/2938 385/24 |
| 2004/0198453 A1* | 10/2004 | Cutrer | H04W 88/085 455/562.1 |
| 2004/0203384 A1 | 10/2004 | Sugikawa et al. | |
| 2005/0232643 A1 | 10/2005 | Aronson et al. | |
| 2006/0182446 A1 | 8/2006 | Kim et al. | |
| 2007/0098405 A1* | 5/2007 | McEwan | H04B 10/2503 398/58 |
| 2008/0063397 A1 | 3/2008 | Hu et al. | |
| 2008/0181171 A1* | 7/2008 | Koziy | H04W 88/085 370/328 |
| 2008/0238682 A1 | 10/2008 | Kuwako et al. | |
| 2009/0157064 A1 | 6/2009 | Hodel | |
| 2009/0240945 A1 | 9/2009 | Aronson | |
| 2010/0001862 A1 | 1/2010 | Wilson et al. | |
| 2010/0014494 A1 | 1/2010 | Schmidt et al. | |
| 2010/0178936 A1 | 7/2010 | Wala et al. | |
| 2010/0278530 A1 | 11/2010 | Kummetz et al. | |
| 2010/0297942 A1 | 11/2010 | Kaiser et al. | |
| 2011/0003608 A1 | 1/2011 | Forenza et al. | |
| 2011/0105184 A1 | 5/2011 | Piirainen et al. | |
| 2011/0201368 A1 | 8/2011 | Faccin et al. | |
| 2011/0261391 A1 | 10/2011 | Oba et al. | |
| 2011/0293279 A1* | 12/2011 | Lam | H04J 14/02 398/79 |
| 2011/0314522 A1 | 12/2011 | Palanigounder et al. | |
| 2012/0002594 A1 | 1/2012 | Rácz et al. | |
| 2012/0246351 A1 | 9/2012 | Sybesma et al. | |
| 2013/0028194 A1 | 1/2013 | Chun et al. | |
| 2013/0163762 A1 | 6/2013 | Zhang et al. | |
| 2013/0189941 A1 | 7/2013 | Abbott et al. | |
| 2014/0016583 A1 | 1/2014 | Smith | |
| 2014/0037292 A1* | 2/2014 | Stapleton | H04B 10/25753 398/68 |
| 2014/0089028 A1 | 3/2014 | Marshall et al. | |

FOREIGN PATENT DOCUMENTS

| | | |
|---|---|---|
| KR | 20090106101 A | 10/2009 |
| WO | 2009130199 A1 | 10/2009 |
| WO | 2010126667 A1 | 11/2010 |
| WO | 2011047281 A1 | 4/2011 |
| WO | 2014011832 A1 | 1/2014 |

OTHER PUBLICATIONS

International Bureau, "International Preliminary Report on Patentability from PCT Application No. PCT/US2013/050008 dated Jan. 22, 2015", from Foreign Counterpart to U.S. Appl. No. 13/939,392, dated Jan. 22, 2015, pp. 1-7, Published: WO.

International Searching Authority, "International Search Report and Written Opinion of the International Searching Authority from PCT Application No. PCT/US2013/050008 dated Nov. 27, 2013", from Foreign Counterpart to U.S. Appl. No. 13/939,392, dated Nov. 27, 2013, pp. 1-11, Published: WO.

U.S. Patent and Trademark Office, "Advisory Action", U.S. Appl. No. 13/939,392, dated Nov. 23, 2016, pp. 1-6, Published: US.

U.S. Patent and Trademark Office, "Advisory Action", U.S. Appl. No. 13/939,392, dated Dec. 22, 2015, pp. 1-4, Published: US.

U.S. Patent and Trademark Office, "Final Office Action", U.S. Appl. No. 13/939,392, dated Sep. 6, 2016, pp. 1-31, Published: US.

U.S. Patent and Trademark Office, "Final Office Action", U.S. Appl. No. 13/939,392, dated Oct. 8, 2015, pp. 1-31, Published: US.

U.S. Patent and Trademark Office, "Notice of Allowance", U.S. Appl. No. 13/939,392, dated Apr. 18, 2018, pp. 1-14, Published: US.

U.S. Patent and Trademark Office, "Notice of Pre-Appeal Brief Decision", U.S. Appl. No. 13/939,392, dated Jan. 9, 2017, pp. 1-2, Published: US.

U.S. Patent and Trademark Office, "Office Action", U.S. Appl. No. 13/939,392, dated Apr. 13, 2016, pp. 1-28, Published: US.

U.S. Patent and Trademark Office, "Office Action", U.S. Appl. No. 13/939,392, dated Jun. 3, 2015, pp. 1-36, Published: US.

U.S. Patent and Trademark Office, "Office Action", U.S. Appl. No. 13/939,392, dated Nov. 9, 2017, pp. 1-32, Published: US.

English translation of Wang, Yun et al., "Multi-Manufacturer Remote Radio Unit Management Method", from CN 101400187 A, Apr. 1, 2009, pp. 1-18.

U.S. Patent and Trademark Office, "Examiner's Answer", U.S. Appl. No. 13/939,392, dated May 5, 2017, pp. 1-10, Published: US.

U.S. Patent and Trademark Office, "Restriction Requirement", U.S. Appl. No. 13/939,392, dated Mar. 19, 2015, pp. 1-6, Published: US.

European Patent Office, "Extended European Search Report from EP Application No. 19169108.8 dated May 16, 2019", from Foreign Counterpart to U.S. Appl. No. 13/939,392, pp. 1-8, Published: EP.

European Patent Office, "Communication Pursuant to Article 94(3) EPC", from EP Application No. 19169108.8 dated Nov. 26, 2021, from Foreign Counterpart to U.S. Appl. No. 16/063,505, pp. 1 through 5, Published: EP.

* cited by examiner

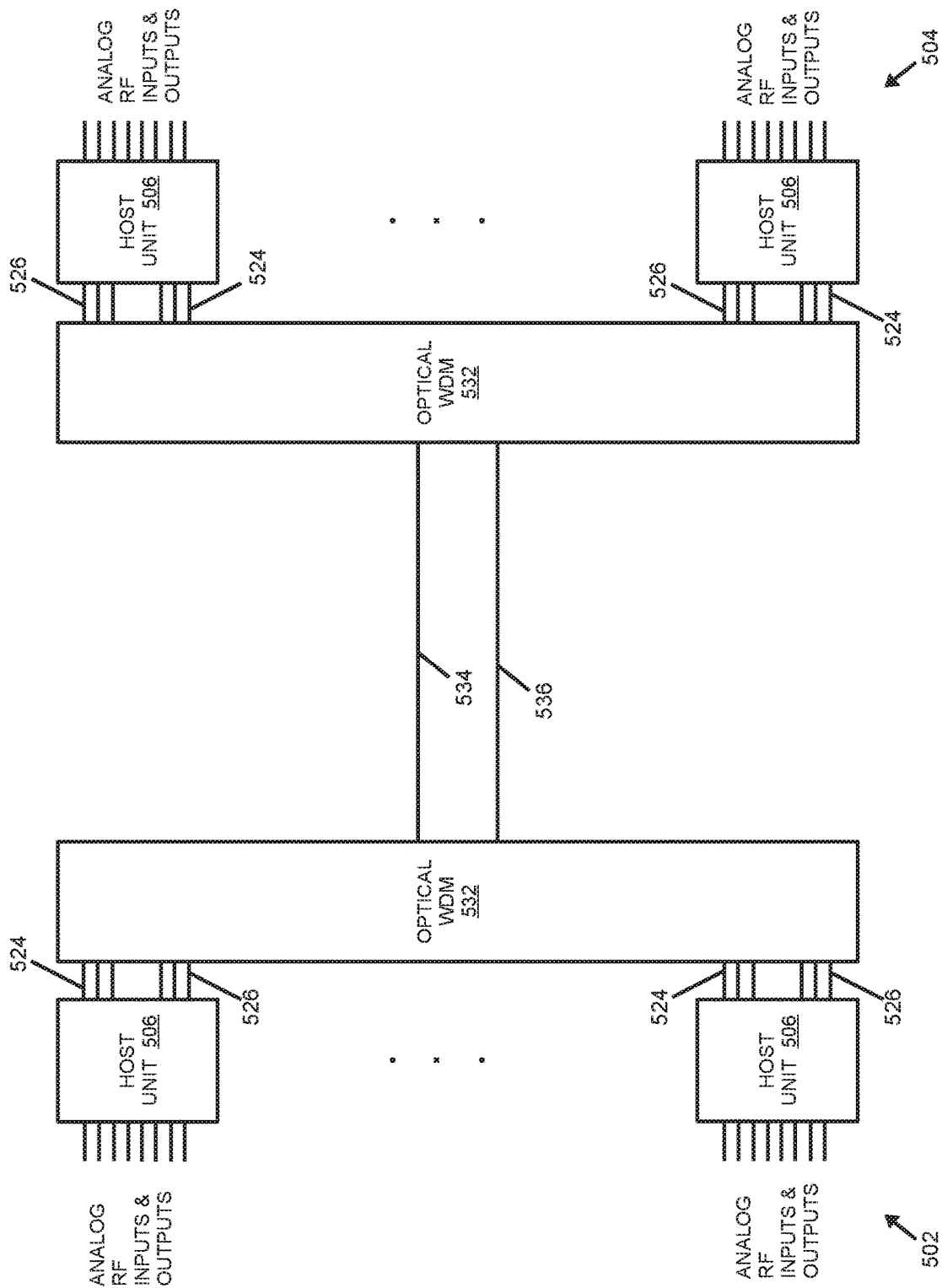

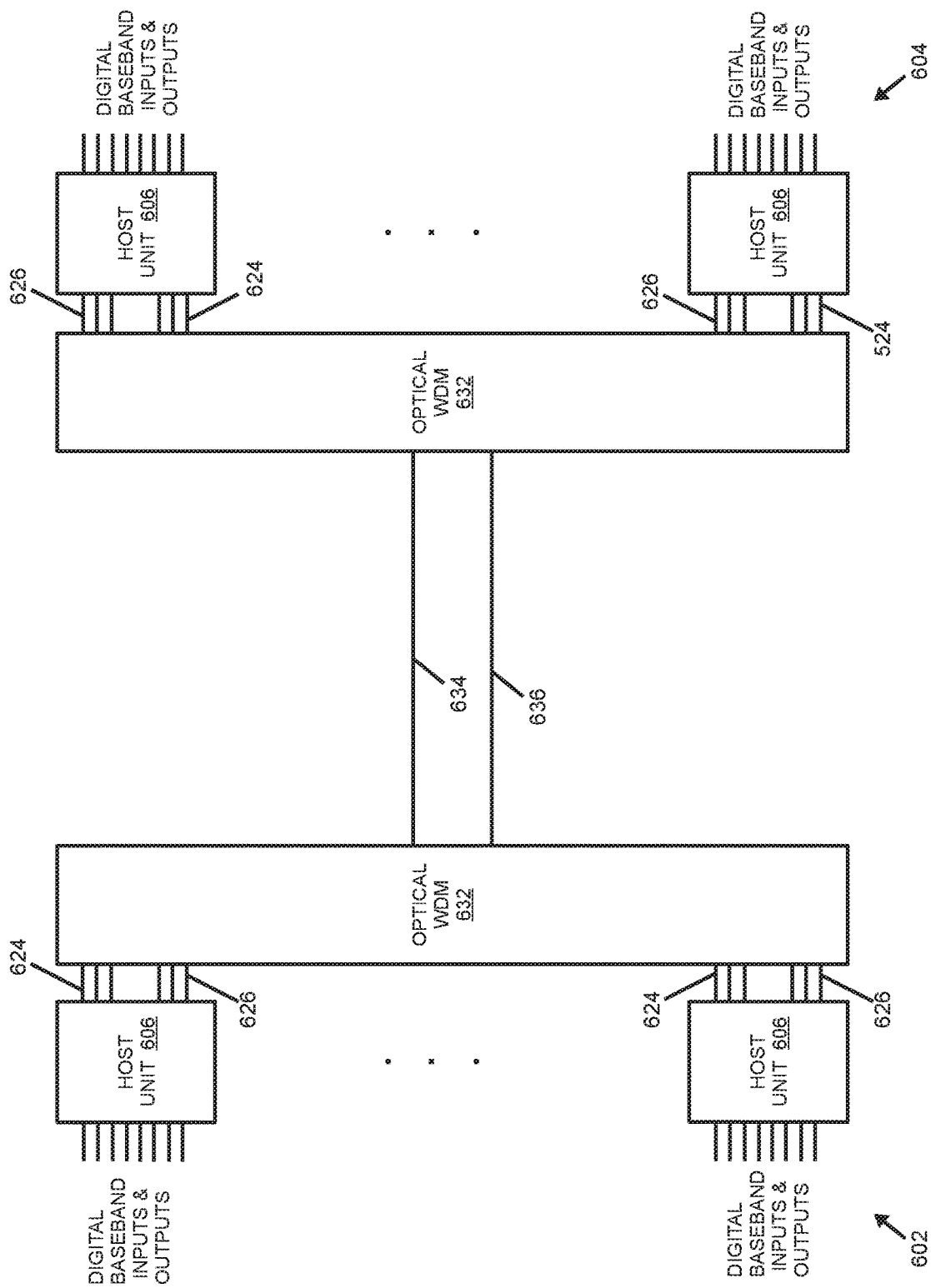

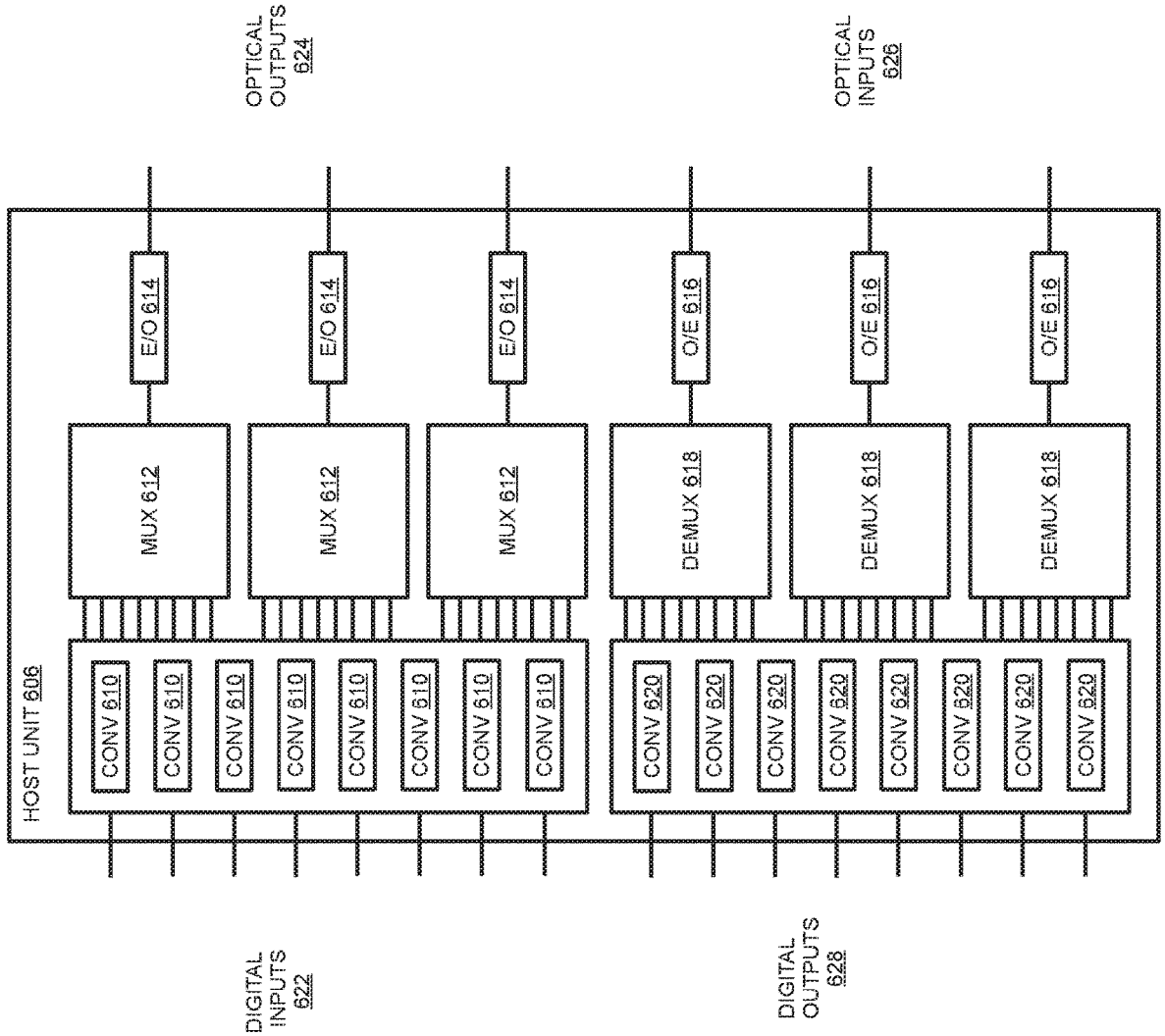

RF TRANSPORT NETWORK

CROSS-REFERENCE TO RELATED APPLICATIONS

This application is a continuation of U.S. application Ser. No. 13/939,392, filed on Jul. 11, 2013, which claims the benefit of U.S. Provisional Patent Application Ser. No. 61/670,482, filed on Jul. 11, 2012, the contents of each of which are hereby incorporated herein by reference.

BACKGROUND

One way that a wireless cellular service provider can improve the coverage provided by a given base station or group of base stations is by using a distributed antenna system (DAS). In a DAS, radio frequency (RF) signals are communicated between a host unit and one or more remote antenna units (RAUs). The host unit can be communicatively coupled to one or more base stations directly by connecting the host unit to the base station using, for example, coaxial cabling. The host unit can also be communicatively coupled to one or more base stations wirelessly, for example, using a donor antenna and a bi-directional amplifier (BDA).

RF signals transmitted from the base station (also referred to here as "downlink RF signals") are received at the host unit. The host unit uses the downlink RF signals to generate a downlink transport signal that is distributed to one or more of the RAUs. Each such RAU receives the downlink transport signal and reconstructs the downlink RF signals based on the downlink transport signal and causes the reconstructed downlink RF signals to be radiated from at least one antenna coupled to or included in that RAU. A similar process is performed in the uplink direction. RF signals transmitted from mobile units (also referred to here as "uplink RF signals") are received at each RAU. Each RAU uses the uplink RF signals to generate an uplink transport signal that is transmitted from the RAU to the host unit. The host unit receives and combines the uplink transport signals transmitted from the RAUs. The host unit reconstructs the uplink RF signals received at the RAUs and communicates the reconstructed uplink RF signals to the base station. In this way, the coverage of the base station can be expanded using the DAS.

One or more intermediate devices (also referred to here as "expansion hubs" or "expansion units") can be placed between the host unit and the remote antenna units in order to increase the number of RAUs that a single host unit can feed and/or to increase the host-unit-to-RAU distance.

Typically, the host unit, the RAUs, and any intermediary devices are designed to use proprietary protocols for communications that occur within the DAS. As a result, the host unit, the RAUs, and the intermediary devices are typically sold by the same original equipment manufacture. However, a conventional DAS network typically does not include any mechanism to ensure that only authorized RAUs are used in a given DAS network.

One type of DAS is a so-called digital DAS. In one common digital DAS configuration, a host unit digitizes analog downlink RF signals received from one or more base stations (either directly or via a donor antenna and BDA). The digital data that results from digitizing each of the base station inputs is framed together and communicated over one or more fibers to multiple RAUs, where each RAU converts the digital data back to downstream analog RF signals for radiation from antennas associated with each RAU. Similar processing is performed in the upstream direction. Upstream analog RF signals received on the antenna coupled to each RAU are digitized, and the resulting digital data is framed together and communicated over a fiber to the host unit. The host unit receives the upstream digital data and converts the digital data back to upstream analog RF signals that can be provided to a base station for processing thereby.

Typically, such a digital DAS is implemented in a point-to-multipoint topology, where the host unit is coupled to each RAU over a respective pair of optical fibers.

SUMMARY

One embodiment is directed to a digital antenna system (DAS) comprising a host unit and at least one remote antenna unit located remotely from the host unit, wherein the remote antenna unit is communicatively coupled to the host unit. The host unit is configured to communicate a downstream transport signal from the host unit to the remote antenna unit. The remote antenna unit is configured to use the downstream transport signal to generate a downstream radio frequency signal for radiation from an antenna associated with the remote antenna unit. The DAS is configured to enable full operation of the remote antenna unit in the DAS if an authentication process has been successfully performed for the remote antenna unit, wherein full operation of the remote antenna unit in the DAS is not enabled if the authentication process has not been successfully performed for the remote antenna unit.

Another embodiment is directed to a remote antenna unit for use in a distributed antenna (DAS) comprising the remote antenna unit and a host unit. The remote antenna unit comprises a port to attach at least one cable that is used to communicatively couple the remote antenna unit to the host unit. The remote antenna unit is configured to generate a downstream radio frequency signal for radiation from an antenna associated with the remote antenna unit from a downstream transport signal received at the remote antenna unit from the host unit. The remote antenna unit is configured to communicate information used in an authentication process that is used to determine whether to enable operation of the remote antenna unit in the DAS.

Another embodiment is directed to a host unit for use in a digital antenna system (DAS) comprising the host unit and at least one remote antenna unit located remotely from the host unit and that is communicatively coupled to the host unit. The host unit comprises an interface to communicatively couple the host unit the remote antenna unit. The host unit is configured to generate a downstream transport signal, wherein the downstream transport signal is communicated from the host unit to the remote antenna unit for use by the remote antenna unit in generating a downstream radio frequency signal for radiation from an antenna associated with the remote antenna unit. The host unit is configured to enable full operation of the remote antenna unit in the DAS if an authentication process has been successfully performed for the remote antenna unit, wherein full operation of the remote antenna unit in the DAS is not enabled if the authentication process has not been successfully performed for the remote antenna unit.

Another embodiment is directed to a method for use in a digital antenna system (DAS) that comprises a host unit and at least one remote antenna unit located remotely from the host unit. The remote antenna unit is communicatively coupled to the host unit. The method comprises performing an authentication process related to the remote antenna unit and enabling full operation of the remote antenna unit in the DAS if the authentication process has been successfully performed for the remote antenna unit. Full operation of the remote antenna unit in the DAS is not enabled if the authentication process has not been successfully performed for the remote antenna unit.

Another embodiment is directed to a host-to-host network comprising a plurality of first host units located at a first end, each of the plurality of first host units is configured to output a plurality of optical output signals and receive a plurality of optical input signals. The network further comprises a plurality of second host units located at a second end, each of the plurality of second host units is configured to output a plurality of optical output signals and receive a plurality of optical input signals. The network further comprises a first optical wavelength division multiplexer configured to combine the optical outputs signals of the first host units and output a corresponding first combined optical output over a first optical fiber. The network further comprises a second optical wavelength division multiplexer configured to receive the first combined optical output from the first fiber and demultiplex the optical output signals and provide them as the optical input signals for the second host units. The second optical wavelength division multiplexer is configured to combine the optical outputs signals of the second host units and output a corresponding second combined optical output over a second optical fiber. The first optical wavelength division multiplexer is configured to receive the second combined optical output form the second fiber and demultiplex the optical output signals and provide them as the optical input signals for the first host units.

DRAWINGS

FIGS. 5A-5B are block diagrams of one exemplary embodiment of a digital RF transport network that implements a "host-to-host" topology.

FIGS. 6A-6B are block diagrams of another exemplary embodiment of a digital RF transport network that implements a "host-to-host" topology.

DETAILED DESCRIPTION

Figure 1:
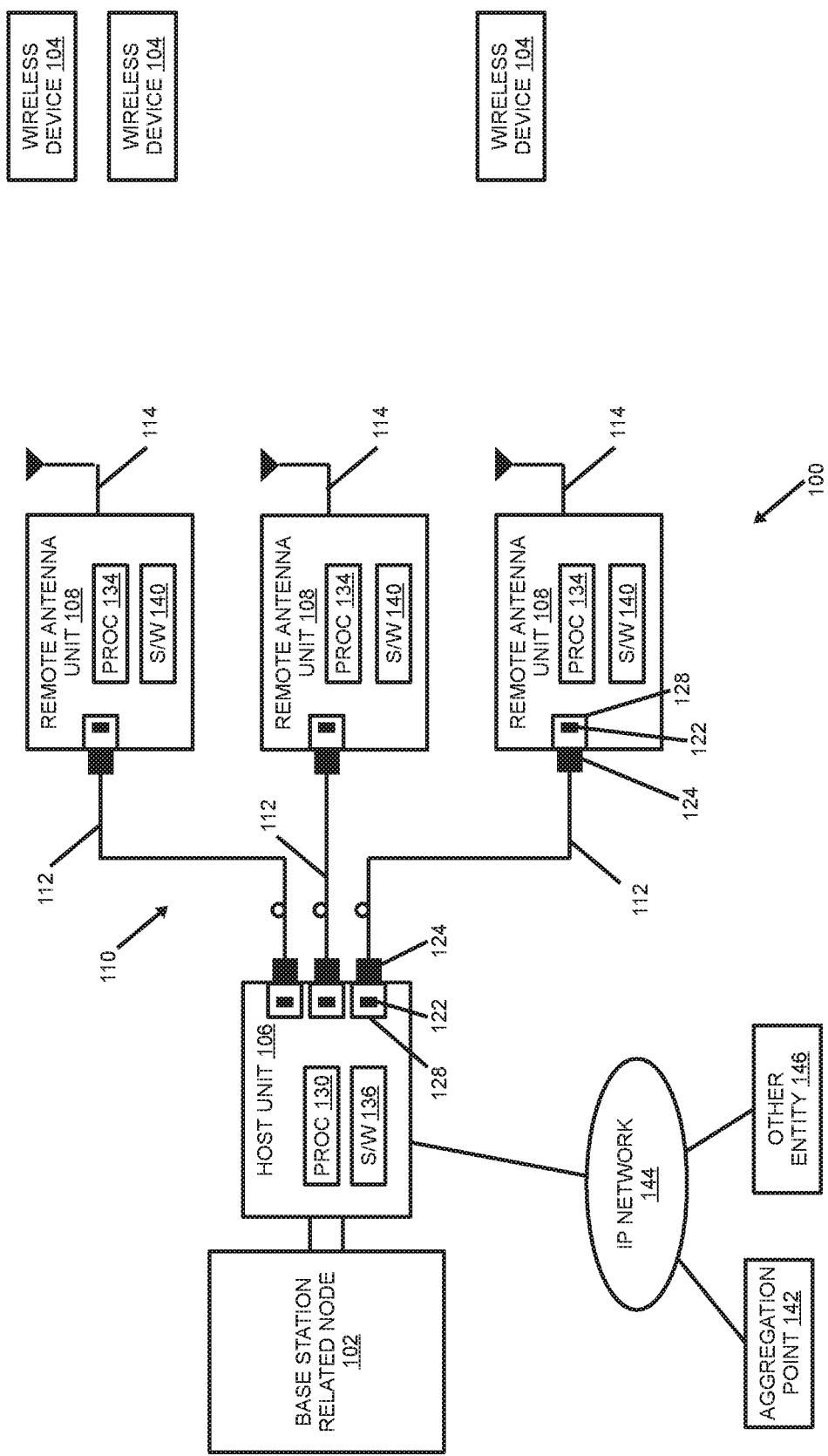
FIG. 1 is a block diagram of one exemplary embodiment of a distributed antenna system (DAS) that is configured to use managed connectivity to communicatively couple the various nodes of the DAS.

FIG. 1 is a block diagram of one exemplary embodiment of a distributed antenna system (DAS) 100 that is configured to use managed connectivity to communicatively couple the various nodes of the DAS 100.

In the example shown in FIG. 1, DAS 100 is used to distribute bi-directional wireless communications between one or more base station-related nodes 102 and one or more wireless devices 104 (for example, mobile telephones, mobile computers, and/or combinations thereof such as personal digital assistants (PDAs) and smartphones). In the exemplary embodiment shown in FIG. 1, the DAS 100 is used to distribute a plurality of bi-directional radio frequency bands. Also, each such radio frequency band is typically used to communicate multiple logical bi-directional RF channels.

DAS 100 can be configured to distribute wireless communications that use licensed radio frequency spectrum, such as cellular radio frequency communications. Examples of such cellular RF communications include cellular communications that support one or more of the second generation (2G), third generation (3G), and fourth generation (4G) Global System for Mobile communication (GSM) family of telephony and data specifications and standards, one or more of the second generation (2G), third generation (3G), and fourth generation (4G) Code Division Multiple Access (CDMA) family of telephony and data specifications and standards, and/or the WIMAX family of specification and standards. DAS 100 can also be configured to distribute wireless communications that make use of unlicensed radio frequency spectrum such as wireless local area networking communications that support one or more of the IEEE 802.11 family of standards. The DAS technology described here can be used to distribute combinations of licensed and unlicensed radio frequency spectrum in the using the same DAS.

In one exemplary implementation of the example DAS 100 shown in FIG. 1, the DAS is configured to distribute wireless communications that use frequency division duplexing in to order to support bi-directional communications. In such an implementation, each bi-directional radio frequency band distributed by the DAS 100 includes a separate radio frequency band for each of two directions of communications. One direction of communication is from the base station-related node 102 to a wireless device 104 and is referred to here as the "downstream" or "downlink" direction. The other direction of communication is from the wireless device 104 to the base station-related node 102 and is referred to here as the "upstream" or "uplink" direction. Each of the distributed bi-directional radio frequency bands includes a respective "downstream" band in which downstream RF channels are communicated for that bi-directional radio frequency band and an "upstream" band in which upstream RF channels are communicated for that bi-directional radio frequency band. The downstream and upstream bands for a given bi-directional radio frequency band need not be, and typically are not, contiguous. To support frequency division duplexing, the DAS 100 is configured to process and distribute the upstream and downstream signals separately.

In other embodiments, the DAS 100 is configured to communicate at least some wireless communications that use other duplexing techniques (such as time division duplexing, which is used, for example, in some WIMAX implementations). For example, in one exemplary implementation, the DAS is configured to distribute wireless communications that use time division duplexing in to order to support bi-directional communications. In such an implementation, each bi-directional radio frequency band distributed by the DAS 100 uses the same frequency band for both downstream and upstream communications. In such an implementation, the various nodes in the DAS 100 include switching functionality to switch between communicating in the downstream direction and the communicating in the upstream direction as well as functionality for synchronizing such switching with the time division duplexing scheme used by the RF communications that are being distributed. Examples of schemes for implementing such time division duplexing are described in the following United States patent applications, all of which are incorporated herein by reference: U.S. patent application Ser. No. 09/771,320, filed Jan. 26, 2001, and titled "METHOD AND SYSTEM FOR DISTRIBUTED MULTIBAND WIRELESS COMMUNICATION SIGNALS", issued as U.S. Pat. No. 6,801,767; U.S. patent application Ser. No. 12/144,961, filed Jun. 24, 2008, and titled "METHOD AND APPARATUS FOR FRAME DETECTION IN A COMMUNICATIONS SYSTEM"; U.S. patent application Ser. No. 12/144,939, filed Jun. 24, 2008, and titled "SYSTEM AND METHOD FOR SYNCHRONIZED TIME-DIVISION DUPLEX SIGNAL SWITCHING"; U.S. patent application Ser. No. 12/144,913, filed Jun. 24, 2008, titled "SYSTEM AND METHOD FOR CONFIGURABLE TIME-DIVISION DUPLEX INTERFACE", issued as U.S. Pat. No. 8,208,414.

In the exemplary embodiment shown in FIG. 1, the DAS 100 includes a host unit 106 and one or more remote antenna units 108 that are located remotely from the host unit 106. The DAS 100 shown in FIG. 1 uses one host unit 106 and three remote antenna units 108, though it is to be understood that other numbers of host units 106 and/or remote antenna units 108 can be used.

In the example shown in FIG. 1, the host unit 106 is communicatively coupled to one or more base station-related nodes 102 either directly (for example, via one or more coaxial cable connections) or indirectly (for example, via one or more donor antennas and one or more bidirectional amplifiers). In one implementation of the embodiment shown in FIG. 1, the host unit 106 is communicatively coupled to one or more base stations that transmit and receive radio frequency wireless communications (that is, the base station-related node 102 comprises one or more base stations). In such an implementation, the output of the one or more base stations may need to attenuated or otherwise conditioned before being input to the host unit 106.

In another implementation of such an embodiment, the host unit 106 includes functionality that implements one or more functions that historically have been performed by a traditional base station (for example, base band processing) and, in such an implementation, the host unit 106 is communicatively coupled to one or more radio network controllers, base station controllers, or similar nodes (for example, using an Internet Protocol (IP) network and/or one or more traditional TDM links (for example, one or more T1 or E1 connections)).

In the exemplary embodiment shown in FIG. 1, the host unit 106 is communicatively coupled to each remote antenna units 108 over transport communication media 110. The transport communication media 110 can be implemented in various ways. For example, the transport communication media can be implemented using respective separate point-to-point communication links, for example, where respective optical fiber or copper cabling is used to directly connect the host unit 106 to each remote antenna unit 108. One such example is shown in FIG. 1, where the host unit 106 is directly connected to each remote antenna unit 108 using a respective optical fiber 112. Also, in the embodiment shown in FIG. 1, a single optical fiber 112 is used to connect the host unit 106 to each remote antenna unit 108, where wave division multiplexing (WDM) is used to communicate both downstream and upstream signals over the single optical fiber 112. In other embodiments, the host unit 106 is directly connected to each remote antenna unit 108 using more than one optical fiber (for example, using two optical fibers, where one optical fiber is used for communicating downstream signals and the other optical fiber is used for communicating upstream signals). Also, in other embodiments, the host unit 106 is directly connected to one or more of the remote antenna units 108 using other types of communication media such a coaxial cabling (for example, RG6, RG11, or RG59 coaxial cabling), twisted-pair cabling (for example, CAT-5 or CAT-6 cabling), or wireless communications (for example, microwave or free-space optical communications).

Figure 2:
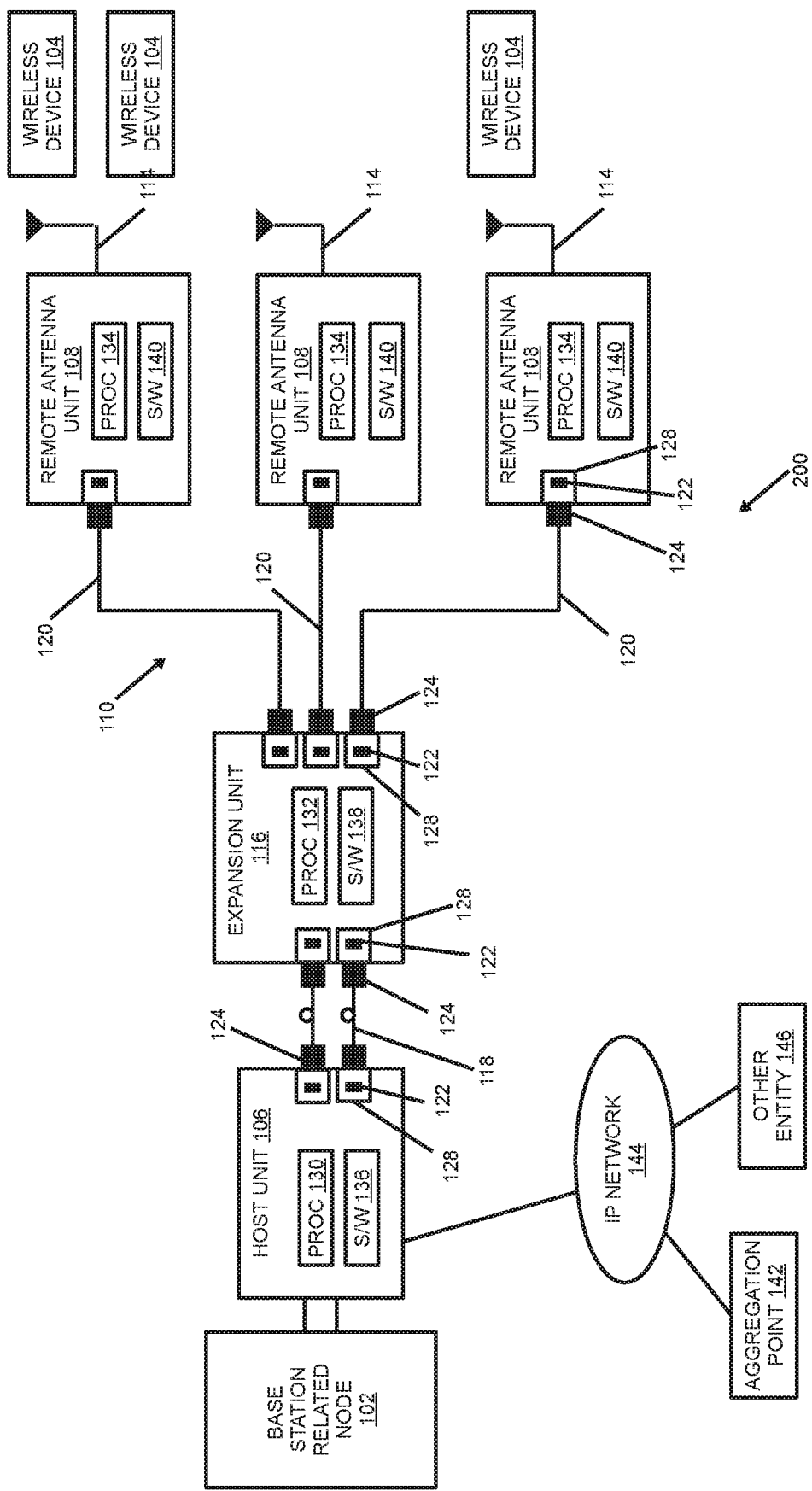
FIG. 2 is a block diagram of another exemplary embodiment of a distributed antenna system (DAS) that is configured to use managed connectivity to communicatively couple the various nodes of the DAS.

The transport communication media 110 can also be implemented using shared point-to-multipoint communication media in addition to or instead of using point-to-point communication media. One example of such an implementation is where the host unit 106 is directly coupled to an intermediary unit (also sometimes referred to as an "expansion" unit), which in turn is directly coupled to multiple remote antenna units 108. One example of such a DAS 200 is shown in FIG. 2, where the host unit 106 is directly connected to an expansion unit 116 using a pair of optical fibers 118 (one fiber being used for downstream communications and the other fiber being used for upstream communications) and where the expansion hub 116, in turn, is directly connected to the multiple remote antenna units 108 using respective coaxial cables 120 (over which both downstream and upstream signals are communicated). Another example of a shared transport implementation is where the host unit 106 is coupled to the remote antenna units using an Internet Protocol (IP) network.

Each remote antenna unit 108 includes or is coupled to at least one antenna 114 via which the remote antenna unit 108 receives and radiates radio frequency signals (as described in more detail below). Various antenna configurations can be used. For example, a single antenna 114 can be used for transmitting and receiving all of the frequency bands handled by given remote antenna unit 108. Also, different antennas 114 can be used for transmitting and receiving and/or different antennas 114 can be used for the various frequency bands handled by a given remote antenna unit 108. Other antenna configurations can be used (for example diversity transmit and receive configurations or Multiple-Input-Multiple-Output (MIMO) configurations).

In general, the host unit 106 receives one or more downstream signals from the base station-related nodes 102 and generates one or more downstream transport signals from the received downstream signals (or from signals or data derived therefrom). The host unit 106 then transmits the downstream transport signals to the remote antenna units 108 via the transport media 110 (and any intermediary devices that are located between the host unit 106 and each remote antenna unit 108). Each remote antenna unit 108 receives at least one downstream transport signal. Each remote antenna unit 108 generates one or more downstream radio frequency signals using, at least in part, the received at least one downstream transport signal (or from signals or data derived therefrom) and causes the one or more downstream radio frequency signals to be radiated from the one or more remote antennas 114 coupled to or included in that remote antenna unit 108.

A similar process is performed in the upstream direction. Upstream radio frequency signals are received at one or more remote antenna units 108 via the antennas 114. At each remote antenna unit 108, the remote antenna unit 108 uses the received upstream radio frequency signals to generate respective upstream transport signals that are transmitted from the respective remote antenna units 108 to the host unit 106. The host unit 106 receives the upstream transport signals transmitted from the remote antenna units 108. The host unit 106 generates one or more upstream signals for communicating to one or more of the base station-related nodes 102 from one or more of the received upstream transport signals (or from signals or data derived therefrom). In connection with generating the upstream signals for the base station-related nodes 102, the host unit 106 may combine signals or data received from multiple remote antenna units 108.

In implementations where the base station-related nodes 102 comprises base stations, the downstream signals received at the host unit 106 comprise downstream radio frequency signals and the upstream signals generated by the host unit 106 for communicating to the base stations comprise upstream radio frequency signals.

In such implementations, the DAS 100 can be implemented as a digital DAS 100 in which the downstream radio frequency signals received at the host unit 106 are digitized by the host unit 106 (for example, by down converting the received downstream radio frequency signals to an intermediate frequency and then digitizing the resulting intermediate frequency signals). The digitized downstream radio frequency data is included in the downstream transport signals that are communicated to the remote antenna units 108. The remote antenna units 108 then use the digitized downstream radio frequency data to generate the downstream radio frequency signals (for example, by performing a digital-to-analog (D/A) conversion on the digitized downstream radio frequency data, up converting the resulting analog signal to an appropriate radio frequency band, and filtering and amplifying the resulting downstream radio frequency signals).

In such a digital DAS example, in the upstream direction, upstream radio frequency signals received at the remote antenna units 108 are digitized by the remote antenna units 108 (for example, by down converting the received upstream radio frequency signals to an intermediate frequency and then digitizing the resulting intermediate frequency signals). The digitized upstream radio frequency data is included in the upstream transport signals that are communicated from the remote antenna units 108 to the host unit 106. The host unit 106 then uses the digitized upstream radio frequency data to generate the upstream radio frequency signals for communicating to the base stations (for example, by performing a digital-to-analog (D/A) conversion on the digitized upstream radio frequency data, up converting the resulting signals to an appropriate radio frequency band, and filtering and amplifying the resulting upstream radio frequency signals). The host unit 106 can combine data or signals received from multiple remote antenna units 108.

The DAS 100 can also be implemented as an analog DAS 100 in which the downstream and upstream transport signals comprise analog versions of the downstream radio frequency signals received at the host unit 106 and the upstream radio frequency signals received at the remote antenna units 108, respectively. The downstream and upstream transport signals can include frequency shifted or non-frequency shifted versions of the downstream radio frequency signals and the upstream radio frequency signals, respectively.

In one example of a frequency shifting analog DAS 100, the downstream radio frequency signals received at the host unit 106 are frequency shifted by the host unit 106 (for example, by down converting the received downstream radio frequency signals to an intermediate frequency). The frequency shifted downstream transport signals are included in the downstream transport signals that are communicated to the remote antenna units 108. The remote antenna units 108 use the frequency shifted downstream signals to generate the downstream radio frequency signals (for example, by up converting the frequency shifted signals to an appropriate radio frequency band, and filtering and amplifying the resulting downstream radio frequency signals).

In such a frequency shifting analog DAS example, in the upstream direction, upstream radio frequency signals received at the remote antenna units 108 are frequency shifted by the remote antenna units 108 (for example, by down converting the received upstream radio frequency signals to an intermediate frequency). The frequency shifted upstream signals are included in the upstream transport signals that are communicated from the remote antenna units 108 to the host unit 106. The host unit 106 uses the frequency shifted upstream signals to generate the upstream radio frequency signals for communicating to the base stations (for example, by up converting the frequency shifted signals to an appropriate radio frequency band, and filtering and amplifying the resulting upstream radio frequency signals). The host unit 106 can combine data or signals received from multiple remote antenna units 108.

In implementations where the host unit 106 comprises one or more functions that have traditionally been implemented by a base station (for example, where the host unit 106 includes a small base station or base band module), the downstream signals received at the host unit 106 comprise downstream signals that include the payload, signaling, control, and/or other data needed by such functions. For example, these downstream signals can be used by the functionality in the host unit 106 to generate digital downstream baseband data, which is included in the downstream transport signals that are communicated to the remote antenna units 108. The remote antenna units 108 use the downstream baseband data to generate the downstream radio frequency signals (for example, by performing a digital-to-analog (D/A) conversion on the received baseband data, up converting the resulting signals to appropriate radio frequency bands, and filtering and amplifying the resulting downstream radio frequency signals).

In such an example, in the upstream direction, the remote antenna units 108 generate digital baseband data from the upstream radio frequency signals received via the antennas 114 (for example, by filtering, attenuating, and/or amplifying the received upstream radio frequency signals, down converting the conditioned upstream radio frequency signals, and performing an analog-to-digital (A/D) conversion on the resulting down converted signals). The upstream baseband data is included in the upstream transport signals that are communicated from the remote antenna units 108 to the host unit 106. The functionality in the host unit 106 uses the received upstream baseband data for the baseband or other processing performed in the host unit 106. The host unit 106 can combine data or signals received from multiple remote antenna units 108.

Also, DAS 100 can be implemented using combinations of any of the aforementioned types of DAS architectures.

In some implementations, the DAS 100 is configured as a "base station hotel" or "neutral host" in which multiple wireless service providers share a single DAS 100.

Figure 3:
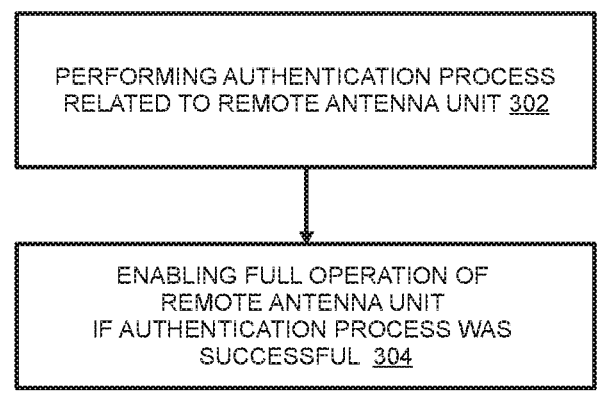
FIG. 3 is a flow diagram of one example of a method of authenticating a remote antenna unit for use in a DAS.

FIG. 3 is a flow diagram of one example of a method 300 of authenticating a remote antenna unit 108 for use in the DAS 100. Method 300 is described in the context of DAS 100 shown in FIGS. 1 and 2 but it is to be understood that embodiments of method 300 can be implemented in other distributed antenna systems.

Method 300 comprises performing an authentication process related to the remote antenna unit 108 (block 302) and enabling full operation of the remote antenna unit 108 in the DAS 100 only if the authentication process has been successfully performed for the remote antenna unit 108 (block 304). Full operation of each remote antenna unit 108 in the DAS 100 is not enabled if the authentication process has not been successfully performed for the remote antenna unit 108.

Method 300 can be used to ensure that only authorized remote antenna units 108 are being used in the DAS 100. For example, in one usage scenario, the host unit 106 is configured to work with remote antenna units 108 from multiple vendors. In such a scenario, the manufacturer of the host unit 106 may wish to ensure that only authorized remote antenna units 108 are used with the host unit 106. This may be done in connection with a certification program run by the manufacture of the host unit 106 to ensure that the remote antenna units 108 that are used with the host unit 106 comply with the manufacture's specifications and/or to ensure that the remote antenna units 108 comply with regulations promulgated by other entities such as governmental agencies (such as the United States Federal Communications Commission) and cellular service providers.

In one example of method 300, the nodes in the DAS 100 make use of physical layer management (PLM) technology that is used in authenticating the remote antenna units. As shown in FIGS. 1 and 2, the host unit 106, each expansion hub 116, and each remote antenna unit 108 includes a respective interface 122 to read physical layer management (PLM) information any cables that are used to communicatively couple that unit to the other units in the DAS 100. Interface 122 is also referred to here as a "PLM" interface 122. Each cable includes some type of PLM component 124 that is used to store PLM information, and the PLM interface 122 is configured to read at least some of the PLM information stored in the PLM component 124.

At least some of the PLM information read from the PLM component 124 is used in the authentication process.

In the example shown in FIG. 1, each remote antenna unit 108 is coupled directly to the host unit 106 over a respective optical fiber 112. Each optical fiber 112 includes a PLM component 124 that is attached or included in a connector 126 that terminates that optical fiber 112.

In the example shown in FIG. 2, each remote antenna unit 108 is coupled to the host unit 106 via the expansion hub 116. In that example, the host unit 106 is directly coupled to the expansion hub 116 over a pair of optical fibers 118. Each optical fiber 118 includes a PLM component 124 that is attached or included in a connector 126 that terminates that optical fiber 118. Also, the expansion hub 116 is directly coupled to each remote antenna unit 108 over a respective coaxial cable 120. Each coaxial cable 120 includes a PLM component 124 that is attached or included in a connector 126 that terminates that coaxial cable 120.

The host unit 106, each expansion hub 116, and each remote antenna unit 108 include one or more ports 128 to which the respective connectors 126 for the respective optical fibers 112, optical fibers 118, or coaxial cables 120 are connected. The port 128 includes the PLM interface 122. The PLM interface 122 is coupled to a respective programmable processor 130, 132, or 134 that is included in the host unit 106, each expansion hub 116, and each remote antenna unit 108. Each programmable processor 130, 132, and 134 is configured to execute software 136, 138, and 140, respectively, that carries out various functions performed by the host unit 106, each expansion hub 116, and each remote antenna unit 108, respectively. The software 136, 138, and 140, comprises program instructions that are stored (or otherwise embodied) on or in an appropriate non-transitory storage medium or media (such as flash or other non-volatile memory, magnetic disc drives, and/or optical disc drives) from which at least a portion of the program instructions are read by each programmable processor 130, 132, and 134, respectively, for execution thereby. The storage media can be included in, and local to, the host unit 106, expansion unit 116, or the remote antenna unit 108, or remote storage media (for example, storage media that is accessible over the network) and/or removable media can also be used. The host unit 106, each expansion unit 116, and each remote antenna unit 108 also include memory for storing the program instructions (and any related data) during execution by the respective programmable processor 130, 132, and 134, respectively. The memory comprises, in one implementation, any suitable form of random access memory (RAM) now known or later developed, such as dynamic random access memory (DRAM). In other embodiments, other types of memory are used.

The software 136, 138, and 140 in the host unit 106, each expansion unit 116, and each remote antenna unit 108 is configured to use the respective PLM interface 122 to determine when a connector 126 is connected to a respective port 128 and to read the PLM information from the respective PLM component 124.

Also, in this example, the software 136, 138, and 140 is configured to communicate at least some of the PLM information read from the respective PLM component 124 to an aggregation point 142.

In this example, the aggregation point 142 is communicatively coupled to each node in the DAS 100, either directly or indirectly, via an IP network 144. An out-of-band management or control channel that is provided between the host unit 106 and each expansion hub 116 and each remote antenna unit 108 can be used for communicating the PLM information read by the expansion hub 116 and each remote antenna unit 108 to the aggregation point 132 via a connection to the IP network 144 made by the host unit 106. The PLM information read by each expansion hub 116 and each remote antenna unit 108 from the various PLM components 124 can be communicated to the aggregation point 142 in other ways.

The aggregation point 142 is implemented as middleware software executing on one or more servers (or other computers). The aggregation point 142 aggregates information from various entities within a network. The information that is aggregated by the aggregation point 142 includes information that is automatically captured by entities that include functionality for reading PLM components that are integrated into connectors. Such automatically captured information includes information about the identity, type, and length of cable used, information about the identity and type of connector used, and information that associates each such connector (and/or cable) with a respective jack, port, or other attachment point of the relevant entity.

The information that is aggregated by the aggregation point 142 also includes information that is manually entered. Examples of such manually entered information include information about the horizontal runs (including information about the identity, type, length, and location of cabling used), information about the wall plate devices that terminate the various horizontal runs (including information about the identity, type, location, and capabilities of the wall plate device), information about switches or other networking devices (including information about the identity, type, location, and capabilities of the switches or other networking devices), and information that associates each such connector (and/or cable) with a respective jack, port, or other attachment point of the relevant entity. Other types of information that can be aggregated by the aggregation point 142 are described in the patent applications listed here.

The aggregation point 142 can implement an application programming interface (API) by which application-layer functionality can gain access to the physical layer information maintained by the aggregation point 142 using a software development kit (SDK) that describes and documents the API. In this way, applications that make use of such PLM information can be developed without requiring those applications to directly interact with the individual devices in the network.

One function that can be performed by the aggregation point 142 is associating various entities within the network with other entities within the network. The lower-level associations provided to the aggregation point 142 (either manually or automatically) are used to construct a set of associations that identifies a physical communication path through the devices for which the aggregation point 142 has information. For example, the aggregation point 142 can be used to construct a set of associations that identifies a physical communication path between the host unit 106 and each remote antenna unit 108.

As noted above, in the example described herein, the other units in the DAS 100 (that is, the host unit 106 and each expansion hub 116 shown in FIG. 2) can also incorporate PLM technology to read PLM information from the cabling attached to those units and to communicate such information to the aggregation point 142. This can be done in the same manner described above in connection with the remote antenna units 108. This PLM information can be used, for example, in connection with the authentication processing described here and/or for other purposes (for example, general physical layer management and network management). Moreover, PLM information captured from other devices in the network (for example, patch panels, inter-networking devices (such switches, routers, hubs, gateways), optical distribution frames, etc.) can be captured and communicated to aggregation point 142 for use in connection with the authentication processing described here and/or for other purposes (for example, general physical layer management and network management).

One type of PLM technology makes use of an EEPROM or other storage device that is attached to or integrated with a connector on a cable, fiber, or other segment of communication media. With this type of PLM technology, the PLM component 124 would be implemented using the EEPROM or storage device. The storage device is used to store information about the connector or segment of communication media along with other information. The EEPROM or other storage device can be read after the associated connected is inserted into a corresponding jack or other port of a device in the network. In this way, information about wired communication media, devices, systems, and/or networks can be captured in an automated manner. One example of this type of PLM technology is the QUAREO™ PLM technology that is used in products commercially available form TE Connectivity. This type of PLM technology is also described in the following United States patent applications, all of which are hereby incorporated herein by reference: U.S. Provisional Patent Application Ser. No. 61/252,964, filed on Oct. 19, 2009, titled "ELECTRICAL PLUG FOR MANAGED CONNECTIVITY", U.S. Provisional Patent Application Ser. No. 61/253,208, filed on Oct. 20, 2009, titled "ELECTRICAL PLUG FOR MANAGED CONNECTIVITY", U.S. patent application Ser. No. 12/907,724, filed on Oct. 19, 2010, titled "MANAGED ELECTRICAL CONNECTIVITY SYSTEMS", U.S. Provisional Patent Application Ser. No. 61/303,948, filed on Feb. 12, 2010, titled "PANEL INCLUDING BLADE FEATURE FOR MANAGED CONNECTIVITY", U.S. Provisional Patent Application Ser. No. 61/413,844, filed on Nov. 15, 2010, titled "COMMUNICATIONS BLADED PANEL SYSTEMS", U.S. Provisional Patent Application Ser. No. 61/439,693, filed on Feb. 4, 2011, titled "COMMUNICATIONS BLADED PANEL SYSTEMS", U.S. patent application Ser. No. 13/025,730, filed on Feb. 11, 2011, titled "COMMUNICATIONS BLADED PANEL SYSTEMS", U.S. patent application Ser. No. 13/025,737, filed on Feb. 11, 2011, titled "COMMUNICATIONS BLADED PANEL SYSTEMS", U.S. patent application Ser. No. 13/025,743, filed on Feb. 11, 2011, titled "COMMUNICATIONS BLADED PANEL SYSTEMS", U.S. patent application Ser. No. 13/025,750, filed on Feb. 11, 2011, titled "COMMUNICATIONS BLADED PANEL SYSTEMS", U.S. Provisional Patent Application Ser. No. 61/303,961; filed on Feb. 12, 2010, titled "Fiber Plug And Adapter For Managed Connectivity", U.S. Provisional Patent Application Ser. No. 61/413,828, filed on Nov. 15, 2010, titled "Fiber Plugs And Adapters For Managed Connectivity", U.S. Provisional Patent Application Ser. No. 61/437,504, filed on Jan. 28, 2011, titled "Fiber Plugs And Adapters For Managed Connectivity", U.S. patent application Ser. No. 13/025,784, filed on Feb. 11, 2011, titled "Managed Fiber Connectivity Systems", U.S. patent application Ser. No. 13/025,788, filed on Feb. 11, 2011, titled "Managed Fiber Connectivity Systems", U.S. patent application Ser. No. 13/025,797, filed on Feb. 11, 2011, titled "Managed Fiber Connectivity Systems", U.S. patent application Ser. No. 13/025,841, filed on Feb. 11, 2011, titled "Managed Fiber Connectivity Systems", U.S. Provisional Patent Application Ser. No. 61/413,856, filed on Nov. 15, 2010, titled "CABLE MANAGEMENT IN RACK SYSTEMS", U.S. Provisional Patent Application Ser. No. 61/466,696, filed on Mar. 23, 2011, titled "CABLE MANAGEMENT IN RACK SYSTEMS", U.S. Provisional Patent Application Ser. No. 61/252,395, filed on Oct. 16, 2009, titled "MANAGED CONNECTIVITY IN ELECTRICAL SYSTEMS", U.S. patent application Ser. No. 12/905,689, filed on Oct. 15, 2010, titled "MANAGED CONNECTIVITY IN ELECTRICAL SYSTEMS", U.S. Provisional Patent Application Ser. No. 61/252,386, filed on Oct. 16, 2009, titled "MANAGED CONNECTIVITY IN FIBER OPTIC SYSTEMS", U.S. patent application Ser. No. 12/905,658, filed on Oct. 15, 2010, titled "MANAGED CONNECTIVITY IN FIBER OPTIC SYSTEMS", U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM", U.S. Provisional Patent Application Ser. No. 61/467,725, filed on Mar. 25, 2011, titled "DYNAMICALLY DETECTING A DEFECTIVE CONNECTOR AT A PORT", U.S. Provisional Patent Application Ser. No. 61/467,729, filed on Mar. 25, 2011, titled "IDENTIFIER ENCODING SCHEME FOR USE WITH MULTI-PATH CONNECTORS", U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS", and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

Another type of PLM technology makes use of radio frequency identification (RFID) technology. An RFID tag is attached to or integrated with a connector on a cable, fiber, or other segment of communication media. That is, with this type of PLM technology, the PLM component 124 would be implemented using the RFID tag. The RFID tag is used to store information about the connector or segment of communication media along with other information. The RFID tag can be read after the associated connector is inserted into a corresponding jack or other port of a device in the network. In this way, information about wired communication media, devices, systems, and/or networks can be captured in an automated manner.

Another type of PLM technology is so-called "ninth wire" technology. Ninth wire technology makes use of special cables that include an extra conductor or signal path (also referred to here as the "ninth wire" conductor or signal path) that is used for determining which port each end of the cables is inserted into. With this type of PLM technology, the PLM component 124 would be implemented using the ninth wire. One example of ninth wire technology is the AMPTRAC family of connectivity management products that are commercially available from TE Connectivity Ltd. Also, examples of ninth wire technology are described in the following United States patent applications, all of which are hereby incorporated herein by reference: U.S. Pat. No. 7,160,143, titled "SYSTEM FOR MONITORING CONNECTION PATTERN OF DATA PORTS", U.S. Pat. No. 6,961,675, titled "SYSTEM FOR MONITORING CONNECTION PATTERN OF DATA PORTS", U.S. Pat. No. 6,725,177, titled "SYSTEM FOR MONITORING CONNECTION PATTERN OF DATA PORTS", U.S. Pat. No. 6,684,179, titled "SYSTEM FOR MONITORING CONNECTION PATTERN OF DATA PORTS", and U.S. Pat. No. 6,574,586, titled "SYSTEM FOR MONITORING CONNECTION PATTERN OF DATA PORTS".

Other types of PLM technology can be used (for example, bar codes).

The authentication processing is described here as being performed by an "authentication entity". The authentication entity can be implemented in the host unit 106 or in an entity that is external to the DAS 100 (for example, in the aggregation point 142 or in another entity 146 that interacts with the aggregation point 142 in order to obtain information about the DAS 100 including at least some of the PLM information read by the remote antenna unit 108).

Figure 4:
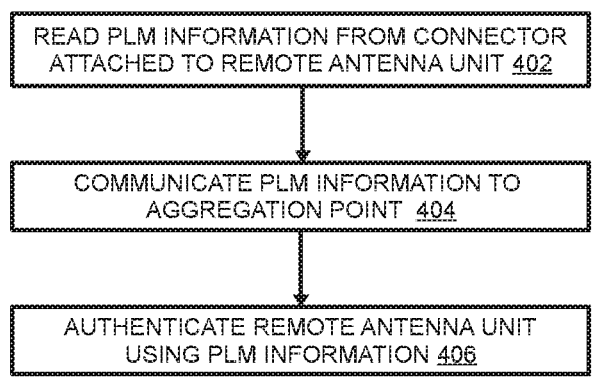
FIG. 4 is a flow diagram of one example of a method of authenticating a remote antenna unit for use in a DAS using PLM information.

FIG. 4 is a flow diagram of one example of a method 400 of authenticating a remote antenna unit 108 for use in the DAS 100 using PLM information. Method 400 is described in the context of DAS 100 shown in FIGS. 1 and 2 but it is to be understood that embodiments of method 400 can be implemented in other distributed antenna systems.

Method 400 comprising reading PLM information from at least one cable used to communicatively couple the remote antenna unit 108 to the host unit 106 (block 402) and communicating, to the aggregation point 142, at least some of the PLM information read from the cable used to communicatively couple the remote antenna unit 108 to the host unit 106 (block 404). In this example, as a noted above, when the software 140 executing on the programmable processor 134 in the remote antenna unit 108 uses the PLM interface 122 to read the PLM information from the PLM component 124 and then communicates at least some of the PLM information to the aggregation point 142. Method 400 further comprises using at least some of the PLM information read from the PLM component 124 to authenticate the remote antenna unit 108 (block 406).

For example, in one implementation, the authentication entity interacts with the aggregation point 142 to check that the remote antenna unit 108 includes operable PLM technology and has successfully read PLM information from the cable used to communicatively couple the remote antenna unit 108 to the host unit 106 and communicated it to the aggregation point 142. That is, the authentication entity, in this example, is checking if remote antenna unit 108 includes a PLM interface 122, has read PLM information from a cable that includes a PLM component 124, and has communicated such PLM information the aggregation point 142. If that is the case, the authentication entity considers the remote antenna unit 108 to be authenticated and to have successfully completed the authentication process and enables full operation of the remote antenna unit 108 in the DAS 100. If that is not the case (for example, the remote antenna unit 108 does not include a PLM interface 122 or a cable that includes a PLM component 124 is not used to couple the remote antenna unit 108 to the host unit 106), then the authentication entity considers the remote antenna unit 108 to not have been authenticated and to have not successfully completed the authentication process and does not enable full operation of the remote antenna unit 108 in the DAS 100. The authentication entity can disable or enable full operation of the remote antenna unit 108 in the DAS 100 by sending a command or other message to the host unit 106, which then either starts distributing downstream and upstream signals with the remote antenna unit 108 (if enabled) or does not distribute downstream and upstream signals with the remote antenna unit 108 (if not enabled).

In another implementation, the authentication entity interacts with the aggregation point 142 to check if the PLM information read by the remote antenna unit 108 and communicated to the aggregation point 142 includes predetermined information (for example, a serial number failing within a particular range or predetermined code). If the PLM information includes the predetermined information, the authentication entity considers the remote antenna unit 108 to be authenticated and to have successfully completed the authentication process and enables full operation of the remote antenna unit 108 in the DAS 100. If the PLM information does not include the predetermined information, then the authentication entity considers the remote antenna unit 108 to not have been authenticated and to have not successfully completed the authentication process and does not enable full operation of the remote antenna unit 108 in the DAS 100.

In other implementations, encryption is used in the authentication process. For example, in such implementation, in addition to reading the PLM information and communicating it to the aggregation point 142, the remote antenna unit 108 uses at least some of the PLM information read from the cable used to couple the remote antenna unit 108 to the host unit 106 to generate an authentication code. The authentication code is generated, in this example, by encrypting the PLM information with an encryption key that is shared with the authentication entity. The authentication code generated by the remote antenna unit 108 is then communicated to the authentication entity. The authentication entity can then check the generated authentication code. One way the authentication entity can check the authentication code generated by the remote antenna unit 108 can be done by having the authentication entity itself generate its own version of the authentication code by using the shared encryption key to encrypt the PLM information read by the remote antenna unit 108 and communicated to the aggregation point 142. Then, the authentication entity then checks if the authentication code generated by the remote antenna unit 108 matches the authentication code generated by the authentication entity. If they match, the authentication entity considers the remote antenna unit 108 to be authenticated and to have successfully completed the authentication process and enables full operation of the remote antenna unit 108 in the DAS 100. If the authentication codes do not match, then the authentication entity considers the remote antenna unit 108 to not have been authenticated and to have not successfully completed the authentication process and does not enable full operation of the remote antenna unit 108 in the DAS 100.

Another way the authentication entity can check the authentication code generated by the remote antenna unit 108 is to use the shared encryption key to decrypt the authentication code generated by the remote antenna unit 108 in order to obtain a plain text version of the PLM information that was encrypted by the remote antenna unit 108. Then, the authentication entity can then obtain the corresponding PLM information that was communicated by the remote antenna unit 108 to the aggregation point 142 and compare it to the plain text resulting from decrypting the authentication code. If they match, the authentication entity considers the remote antenna unit 108 to be authenticated and to have successfully completed the authentication process and enables full operation of the remote antenna unit 108 in the DAS 100. If the authentication codes do not match, then the authentication entity considers the remote antenna unit 108 to not have been authenticated and to have not successfully completed the authentication process and does not enable full operation of the remote antenna unit 108 in the DAS 100.

Although the above examples have described the authentication of remote antenna units 108 for use in a DAS 100, it is to be understood that the other nodes in the DAS 100 can be authenticated in the same matter (including for example the host unit 106 and the expansion unit 116).

Also, the techniques described here can be used in DAS and distributed base station configurations (such as distributed base stations that implement one or more of the Common Public Radio Interface (CPRI) and Open Base Station Architecture Initiative (OBSAI) specifications and standards).

Figure 5B:
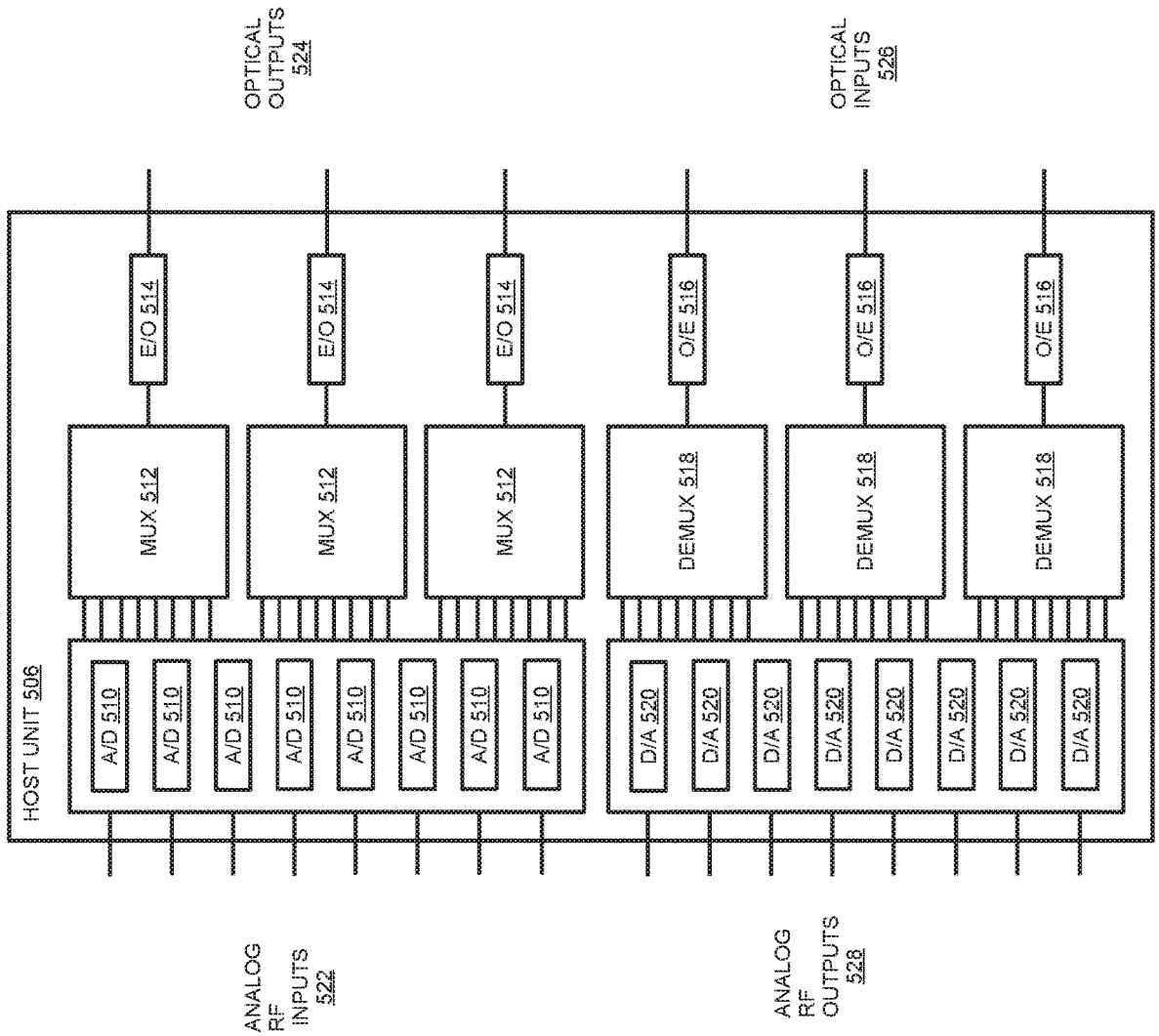

FIGS. 5A-5B are block diagrams of one exemplary embodiment of a digital RF transport network 500 that implements a "host-to-host" topology. As shown in FIG. 5A, the network 500 includes first and second ends 502 and 504. In this exemplary embodiment, twelve host units 506 are deployed at each of the ends 502 and 504 (though it is to be understood that other number of host units 506 can be used).

Each of the host units 506 is implemented in generally the same way. As shown in FIG. 5B, each of the host units 506 includes eight analog-to-digital (A/D) units 510, three multiplexer/serializer units 512, and three optical transmitters 514. Also, each of the host units 506 includes three optical receivers 516, three demultiplexer/deserializer units 518, and eight digital-to-analog (D/A) units 520.

Each host unit 506 has eight analog RF inputs 522 and three optical outputs 524. Also, each host unit 506 has three optical inputs 526 and eight analog RF outputs 528. In FIG. 5A, for the ease of illustration, the eight lines shown as being connected to each host unit 506 represent both the eight analog RF inputs 522 and the eight analog RF outputs 528 for that host unit 506.

Each analog RF input 522 is provided to a respective A/D unit 510, which down converts and digitizes the analog RF input. Each A/D unit 510 outputs digital data to each of the three multiplexer/serializer units 512. Each of the multiplexer/serializer units 512 combines the digital data from one or more of the A/D units 510 into a serial digital data stream, which is provided to a respective optical transmitter 514. The optical transmitter 514 transmits the serial digital data stream as an optical signal, which is output on one of the optical outputs 524.

Each optical input 526 is received by a respective optical receiver 516, which outputs a serial digital data stream based on the optical input. The serial digital data stream includes digital data for up to eight RF signals. The serial digital data stream is provided to a respective demultiplexer/deserializer unit 518, which deserializer and demultiplexer the digital data included on that optical input 526 and provides the digital data for each of the eight RF signals to an appropriate one of the D/A units 520. Each D/A unit 520 digitally sums the digital data provided from the three demultiplexer/deserializer units 518, converts the resulting summed digital data to an analog signal, and upconverts the resulting analog signal to an analog RF signal, which is output as a respective one of the eight analog RF outputs 528.

In this exemplary embodiment, as shown in FIG. 5A, the optical outputs 524 from all of the twelve host units 506 at each end 502 and 504 are multiplexed together using a respective wavelength division multiplexer/demultiplexer 532 and communicated over a respective fiber 534 and 536, where one fiber 534 is used for communicating from the first end 502 to the second end 504 and the other fiber 536 is used for communicating from the second end 504 to the first end 502. In other words, 36 optical signals are communicated over each fiber 534 and 536. At the other end of each fiber 534 and 536, the wavelength multiplexer/demultiplexer 532 demultiplexer the received optical signal and outputs the 36 optical signals communicated over the respective fiber 534 and 536. Each of the 36 optical signals is provided to a respective one of the optical inputs 526 of one of the host units 506.

In one example implementation, where a pair of 40 channel dense wavelength division multiplexer/demultiplexers is used and each host unit 506 has three optical inputs 524 and three optical outputs 526, up to 12 host units can be used at each end. Also, where a SLIC is used to multiplex the three optical outputs for each host unit into a single optical output and to demultiplex a single optical input into the three optical inputs for each host unit, a pair of 8 channel course wavelength division multiplexer/demultiplexers can be used with up to 12 host units at each end.

In this way, very high capacity can be provided between the two ends 502 and 504 of the network 500. This very high capacity can be used in various applications. For example, this network 500 can be used to locate several base stations units or interfaces (providing, for example, up to 96 base station interfaces) at one end 502 of the network 500 and the host units for multiples analog DASs located at the other end 504 of the network 500. This network 500 can also be used in multi-operator or multi-service applications.

In the example shown in FIG. 5, each host unit 506 has eight analog RF inputs 522 and eight analog RF outputs 528. However, in an alternative embodiment shown in FIGS. 6A-6B, each host unit 606 includes eight digital RF inputs 622 and eight digital RF outputs 628. For example, these digital RF inputs and outputs 622 and 628 can be the digital baseband data output and received by a baseband unit (BBU) from a distributed base station architecture system. Examples of such digital data formats are described in specifications and protocols published by the Common Public Radio Interface (CPRI) consortium and the Open Base Station Architecture Initiative (OBSAI) consortium.

In general, the network 600 and host units 606 are the same as the network 500 and host units 506 described above in connection with FIGS. 5A-5B, except as described here in connection with FIGS. 6A-6B. The elements of the exemplary embodiment shown in FIGS. 6A-6B that are similar to corresponding elements of the exemplary embodiment shown in FIGS. 5A-5B are referenced in FIGS. 6A-6B using the same reference numerals used in FIGS. 5A-5B but with the leading numeral changed from a "5" to a "6". Except as described here, the description of the elements set forth above in connection with the exemplary embodiment shown in FIGS. 5A-5B applies to the corresponding elements of the exemplary embodiment shown in FIGS. 6A-6B but generally will not be repeated in connection with FIGS. 6A-6B for the sake of brevity.

In this embodiment, as shown in FIG. 6B, each digital RF input 622 is converted to a digital format that is suitable for use in the rest of the host unit 606 by a converter unit 610. Each converter unit 610 outputs reformatted digital data to each of the three multiplexer/serializer units 612, which processes the reformatted digital data as described above in connection with FIGS. 5A-5B.

Each demultiplexer/deserializer unit 618 deserializer and demultiplexer digital data received on a respective optical input 626 and provides the digital data for each of the eight digital RF outputs 628 to an appropriate one of the converter units 620. Each converter unit 620 converts the received digital data to a digital format that is suitable for use by the baseband unit to which the base unit 506 is coupled. The reformatted digital is output as a respective one of the eight digital RF outputs 628.

The managed connectivity techniques described above in connection with FIGS. 1-4 can be used with the networks 500 and 600 of FIGS. 5A-5B and 6A-6B.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

EXAMPLE EMBODIMENTS

Example 1 includes a digital antenna system (DAS) comprising: a host unit; and at least one remote antenna unit located remotely from the host unit, wherein the remote antenna unit is communicatively coupled to the host unit; wherein the host unit is configured to communicate a downstream transport signal from the host unit to the remote antenna unit; wherein the remote antenna unit is configured to use the downstream transport signal to generate a downstream radio frequency signal for radiation from an antenna associated with the remote antenna unit; wherein the DAS is configured to enable full operation of the remote antenna unit in the DAS if an authentication process has been successfully performed for the remote antenna unit, wherein full operation of the remote antenna unit in the DAS is not enabled if the authentication process has not been successfully performed for the remote antenna unit.

Example 2 includes the DAS of Example 1, wherein the host unit is configured to work with remote antenna units from multiple vendors. Example 3 includes the DAS of any of the Examples 1-2, wherein the remote antenna unit comprises an interface to read physical layer management (PLM) information from at least one cable used to communicatively couple the remote antenna unit to the host unit; and wherein at least some of the PLM information read from the cable used to communicatively couple the remote antenna unit to the host unit is used in the authentication process.

Example 4 includes the DAS of Example 3, wherein the remote antenna unit is configured to communicate, to a PLM aggregation point, at least some of the PLM information read from the cable used to communicatively couple the remote antenna unit to the host unit. Example 5 includes the DAS of Example 4, wherein an out-of-band channel is provided between the host unit and the remote antenna unit over which the remote antenna unit is configured to communicate with the PLM aggregation point.

Example 6 includes the DAS of any of the Examples 1-5, wherein the authentication process is performed by at least one of: the host unit and an entity external to the DAS. Example 7 includes the DAS of any of the Examples 1-6, wherein the authentication process comprises determining if the remote antenna unit read predetermined information from the at least one cable used to communicatively couple the remote antenna unit to the host unit. Example 8 includes the DAS of any of the Examples 1-7, wherein the authentication process comprises: receiving a first authentication code from the remote antenna unit; generating a second authentication code; and comparing the first authentication code to the second authentication code.

Example 9 includes the DAS of any of the Examples 1-8, wherein the authentication process comprises: receiving an authentication code from the remote antenna unit; decrypting the authentication using a key to generate plain text; and determining if the plain text includes predetermined information. Example 10 includes the DAS of Example 9, wherein the predetermined information comprises at least some PLM information read from the cable used to communicatively couple the remote antenna unit to the host unit. Example 11 includes the DAS of Example 10, wherein the authentication process further comprises: receiving at least some PLM information read from the cable used to communicatively couple the remote antenna unit to the host unit by at least one of the remote antenna unit and a device other than the remote antenna unit.

Example 12 includes the DAS of Example 11, wherein the device other than the remote antenna unit comprises at least one of: the host unit, an expansion hub, and a patch panel. Example 13 includes the DAS of any of the Examples 1-12, wherein the host unit is communicatively coupled to the remote antenna unit using at least one intermediary device. Example 14 includes the DAS of Example 13, wherein the intermediary device comprises an expansion hub.

Example 15 includes the DAS of any of the Examples 1-14, wherein the remote antenna unit is configured to generate an upstream transport signal from an upstream radio frequency signal received via at least one antenna associated with the remote antenna unit; wherein the remote antenna unit is configured to communicate the upstream transport signal from the remote antenna unit to the host unit; and wherein the host unit is configured to use the upstream transport signal to generate a upstream signal that is provided by the host unit to at least one base-station related node.

Example 16 includes the DAS of Example 15, wherein the remote antenna unit is configured to generate the upstream transport signal by doing at least one of: down-converting a signal derived from the upstream radio frequency signal; and performing an analog-to-digital conversion (A/D) process on a signal derived from the upstream radio frequency signal. Example 17 includes the DAS of any of the Examples 15-16, wherein the host unit is configured to do at least one of the following in connection with generating the upstream signal from the upstream transport signal: performing a digital-to-analog conversion on a signal derived from the upstream transport signal; and upconverting a signal derived from the upstream transport signal. Example 18 includes the DAS of any of the Examples 1-17, wherein the host unit is coupled to a base-station related node. Example 19 includes the DAS of any of the Examples 1-18, wherein the base-station related node comprises at least one of a base station, a radio access controller, and a base station controller.

Example 20 includes the DAS of any of the Examples 1-19, wherein the host unit is configured to receive downstream radio frequency signal from a base station and to generate the downstream transport signal from the downstream radio frequency signal. Example 21 includes the DAS of any of the Examples 1-20, wherein the host unit is configured to receive digital downstream baseband data from a base station related node and to generate the downstream transport signal from the digital downstream baseband data. Example 22 includes the DAS of any of the Examples 1-21, wherein DAS comprises at least one of an analog DAS and a digital DAS.

Example 23 includes the DAS of any of the Examples 1-22, wherein the host unit is configured to generate the downstream transport signal by doing at least one of: generating digital downstream baseband data using a baseband module or a base station module included in the host unit; performing an analog-to-digital conversion on a signal derived from the downstream signal; and frequency shifting a signal derived from the downstream signal.

Example 24 includes the DAS of any of the Examples 1-23, wherein the remote antenna unit is configured to do at least one of the following in connection with generating the downstream radio frequency signal from the downstream transport signal: performing a digital-to-analog conversion on a signal derived from the downstream transport signal; up-converting a signal derived from the downstream transport signal; a filtering a signal derived from the downstream transport signal; and amplifying a signal derived from the downstream transport signal.

Example 25 includes the DAS of any of the Examples 1-24, further comprising an interface to read physical layer management (PLM) information from at least one cable used to communicatively couple the host unit to the remote antenna unit; and wherein at least some of the PLM information read from the cable used to communicatively couple the host unit to the remote antenna unit is used in the authentication process.

Example 26 includes the DAS of Example 25, wherein the host unit is configured to communicate, to a PLM aggregation point, at least some of the PLM information read from the cable used to communicatively couple the host unit to the remote antenna unit. Example 27 includes the DAS of any of the Examples 1-26, wherein the DAS is configured to enable full operation of an expansion unit in the DAS if an authentication process has been successfully performed for the expansion unit, wherein full operation of the expansion unit in the DAS is not enabled if the authentication process has not been successfully performed for the expansion unit, wherein the remote antenna unit is coupled to the host unit via the expansion unit. Example 28 includes the DAS of any of the Examples 1-27, wherein the DAS is configured to enable full operation of the host unit in the DAS if an authentication process has been successfully performed for the expansion unit, wherein full operation of the host unit in the DAS is not enabled if the authentication process has not been successfully performed for the host unit.

Example 29 includes a remote antenna unit for use in a distributed antenna (DAS) comprising the remote antenna unit and a host unit, the remote antenna unit comprising: a port to attach at least one cable that is used to communicatively couple the remote antenna unit to the host unit; wherein the remote antenna unit is configured to generate a downstream radio frequency signal for radiation from an antenna associated with the remote antenna unit from a downstream transport signal received at the remote antenna unit from the host unit; and wherein the remote antenna unit is configured to communicate information used in an authentication process that is used to determine whether to enable operation of the remote antenna unit in the DAS.

Example 30 includes the remote antenna unit of Example 29, further comprising at least one programmable processor configured to execute software. Example 31 includes the remote antenna unit of any of the Examples 29-30, further comprising an interface to read physical layer management (PLM) information from at least one cable used to communicatively couple the remote antenna unit to the host unit; and wherein at least some of the PLM information read from the cable used to communicatively couple the remote antenna unit to the host unit is used in the authentication process.

Example 32 includes the remote antenna unit of Example 31, wherein the remote antenna unit is configured to communicate, to a PLM aggregation point, at least some of the PLM information read from the cable used to communicatively couple the remote antenna unit to the host unit. Example 33 includes the remote antenna unit of Example 32, wherein an out-of-band channel is provided between the host unit and the remote antenna unit over which the remote antenna unit is configured to communicate with the PLM aggregation point. Example 34 includes the remote antenna unit of any of the Examples 29-34, wherein the remote antenna unit generates the downstream radio frequency signal from the downstream transport signal by doing at least one of: performing a digital-to-analog process on a signal derived from the downstream transport signal; upconverting a signal derived from the downstream transport signal; filtering a signal derived from the downstream transport signal; and amplifying a signal derived from the downstream transport signal.

Example 35 includes the remote antenna unit of any of the Examples 29-34, wherein the remote antenna unit is configured to generate an upstream transport signal from an upstream radio frequency signal received via at least one antenna associated with the remote antenna unit; wherein the remote antenna unit is configured to communicate the upstream transport signal from the remote antenna unit to the host unit; and wherein the host unit is configured to use the upstream transport signal to generate a upstream signal that is provided by the host unit to at least one base-station related node.

Example 36 includes a host unit for use in a digital antenna system (DAS) comprising the host unit and at least one remote antenna unit located remotely from the host unit and that is communicatively coupled to the host unit, the host unit comprising: an interface to communicatively couple the host unit the remote antenna unit; and wherein the host unit is configured to generate a downstream transport signal, wherein the downstream transport signal is communicated from the host unit to the remote antenna unit for use by the remote antenna unit in generating a downstream radio frequency signal for radiation from an antenna associated with the remote antenna unit; wherein the host unit is configured to enable full operation of the remote antenna unit in the DAS if an authentication process has been successfully performed for the remote antenna unit, wherein full operation of the remote antenna unit in the DAS is not enabled if the authentication process has not been successfully performed for the remote antenna unit.

Example 37 includes the host unit of Example 36, wherein the host unit is configured to work with remote antenna units from multiple vendors. Example 38 includes the host unit of any of Examples 36-37, wherein the remote antenna unit is configured to read physical layer management (PLM) information from at least one cable used to communicatively couple the remote antenna unit to the host unit; and wherein at least some of the PLM information read from the cable used to communicatively couple the remote antenna unit to the host unit is used in the authentication process. Example 39 includes the host unit of Example 38, wherein the remote antenna unit is configured to communicate, to a PLM aggregation point, at least some of the PLM information read from the cable used to communicatively couple the remote antenna unit to the host unit.

Example 40 includes the host unit of Example 39, wherein an out-of-band channel is provided between the host unit and the remote antenna unit over which the remote antenna unit is configured to communicate with the PLM aggregation point. Example 41 includes the host unit of any of Examples 36-40, further comprising at least one programmable processor configured to execute software. Example 42 includes the host unit of any of Examples 36-41, further comprising an interface to read physical layer management (PLM) information from at least one cable used to communicatively couple the host unit to the remote antenna unit; and wherein at least some of the PLM information read from the cable used to communicatively couple the host unit to the remote antenna unit is used in the authentication process. Example 43 includes the host unit of Example 42, wherein the host unit is configured to communicate, to a PLM aggregation point, at least some of the PLM information read from the cable used to communicatively couple the host unit to the remote antenna unit.

Example 44 includes the host unit of any of Examples 36-43, wherein the host unit is configured to generate the downstream transport signal by doing at least one of: generating digital downstream baseband data using a base band module or a base station module included in the host unit; performing an analog-to-digital conversion on a signal derived from the downstream signal; and frequency shifting a signal derived from the downstream signal. Example 45 includes the host unit of any of Examples 36-44, wherein the remote antenna unit is configured to generate an upstream transport signal from an upstream radio frequency signal received via at least one antenna associated with the remote antenna unit; wherein the remote antenna unit is configured to communicate the upstream transport signal from the remote antenna unit to the host unit; and wherein the host unit is configured to use the upstream transport signal to generate a upstream signal that is provided by the host unit to at least one base-station related node.

Example 46 includes a method for use in a digital antenna system (DAS) that comprises a host unit and at least one remote antenna unit located remotely from the host unit, wherein the remote antenna unit is communicatively coupled to the host unit, the method comprising: performing an authentication process related to the remote antenna unit; and enabling full operation of the remote antenna unit in the DAS if the authentication process has been successfully performed for the remote antenna unit, wherein full operation of the remote antenna unit in the DAS is not enabled if the authentication process has not been successfully performed for the remote antenna unit.

Example 47 includes the method of Example 46, further comprising using reading physical layer management (PLM) information from at least one cable used to communicatively couple the remote antenna unit to the host unit; and wherein at least some of the PLM information read from the cable used to communicatively couple the remote antenna unit to the host unit is used in the authentication process.

Example 48 includes the method of Example 47, further comprising communicating, to a PLM aggregation point, at least some of the PLM information read from the cable used to communicatively couple the remote antenna unit to the host unit. Example 49 includes the method of any of Examples 46-48, wherein the authentication process is performed by at least one of: the host unit and an entity external to the DAS. Example 50 includes the method of any of Examples 46-49, wherein the authentication process comprises determining if the remote antenna unit read predetermined information from the at least one cable used to communicatively couple the remote antenna unit to the host unit.

Example 51 includes the method of any of Examples 46-50, wherein the authentication process comprises: receiving a first authentication code from the remote antenna unit; generating a second authentication code; and comparing the first authentication code to the second authentication code. Example 52 includes the method of any of Examples 46-51, wherein the authentication process comprises: receiving an authentication code from the remote antenna unit; decrypting the authentication using a key to generate plain text; and determining if the plain text includes predetermined information. Example 53 includes the method of Example 52, wherein the predetermined information comprises at least some PLM information read from the cable used to communicatively couple the remote antenna unit to the host unit. Example 54 includes the method of Example 53, wherein the authentication process further comprises: receiving at least some PLM information read from the cable used to communicatively couple the remote antenna unit to the host unit by at least one of the remote antenna unit and a device other than the remote antenna unit; performing an authentication process related to the remote antenna unit; and enabling full operation of the remote antenna unit in the DAS if the authentication process has been successfully performed for the remote antenna unit, wherein full operation of the remote antenna unit in the DAS is not enabled if the authentication process has not been successfully performed for the remote antenna unit.

Example 55 includes the method of any of Examples 46-54, further comprising: performing an authentication process related to an expansion unit; and enabling full operation of the expansion unit in the DAS if the authentication process has been successfully performed for the expansion unit, wherein full operation of the expansion unit in the DAS is not enabled if the authentication process has not been successfully performed for the expansion unit, wherein the remote antenna unit is coupled to the host unit via the expansion unit. Example 56 includes the method of any of Examples 46-55, further comprising: performing an authentication process related to the host unit; and enabling full operation of the host unit in the DAS if the authentication process has been successfully performed for the host unit, wherein full operation of the host unit in the DAS is not enabled if the authentication process has not been successfully performed for the host unit. Example 57 includes a host-to-host network comprising: a plurality of first host units located at a first end, each of the plurality of first host units is configured to output a plurality of optical output signals and receive a plurality of optical input signals; a plurality of second host units located at a second end, each of the plurality of second host units is configured to output a plurality of optical output signals and receive a plurality of optical input signals; a first optical wavelength division multiplexer configured to combine the optical outputs signals of the first host units and output a corresponding first combined optical output over a first optical fiber; a second optical wavelength division multiplexer configured to receive the first combined optical output from the first fiber and demultiplex the optical output signals and provide them as the optical input signals for the second host units; wherein the second optical wavelength division multiplexer is configured to combine the optical outputs signals of the second host units and output a corresponding second combined optical output over a second optical fiber; and wherein the first optical wavelength division multiplexer is configured to receive the second combined optical output form the second fiber and demultiplex the optical output signals and provide them as the optical input signals for the first host units.

Example 58 includes the network of Example 57, wherein each of the first host units and second host unit includes a respective plurality of multiplexer/serializer units and a plurality of demultiplexer/deserializer units. Example 59 includes the network of any of Examples 57-58, wherein each of the first host units and second host units includes a respective plurality of analog-to-digital converters and a respective plurality of digital-to-analog converters. Example 60 includes the network of any of Examples 57-59, wherein each of the first host units and second host units includes a respective plurality of converters for converting digital baseband unit data to a different digital data format. Example 61 includes the network of any of Examples 57-60, wherein the digital baseband unit data comprises one of CPRI baseband data and OBSAI baseband data.

What is claimed is:

1. A host-to-host network comprising:
   a plurality of first host units located at a first end, wherein each of the plurality of first host units includes a first plurality of optical inputs and a first plurality of optical outputs, wherein each of the plurality of first host units is configured to output a plurality of optical output signals via the first plurality of optical outputs and receive a plurality of optical input signals via the first plurality of optical inputs, wherein each of the plurality of first host units is configured to receive downlink analog radio frequency signals or downlink digital radio frequency signals from one or more base station related nodes, wherein each of the plurality of first host units is configured to generate the plurality of optical output signals from the downlink analog radio frequency signals or the downlink digital radio frequency signals from the one or more base station related nodes;
   wherein each of the plurality of first host units includes:
      a plurality of digital inputs configured to receive digital baseband unit data from one or more baseband units; and
      a respective plurality of converters for converting between the digital baseband unit data and a different digital data format;
   a plurality of second host units located at a second end, wherein each of the plurality of second host units includes a second plurality of optical inputs and a second plurality of optical outputs, wherein each of the plurality of second host units is configured to output a plurality of optical output signals via the second plurality of optical outputs and receive a plurality of optical input signals via the second plurality of optical inputs, wherein each respective second host unit of the plurality of second host units is configured to output downlink transport signals to one or more remote antenna units, wherein each respective remote antenna unit of the one or more remote antenna units is configured to generate downlink radio frequency signals based on the downlink transport signals received from the plurality of second host units and output the downlink radio frequency signals for radiation via one or more antennas coupled to the respective remote antenna unit;
   wherein each of the plurality of second host units includes:
      a plurality of digital outputs configured to output digital downlink transport signals to the one or more remote antenna units; and
      a respective plurality of converters for converting between the different digital data format and a digital format used for the digital downlink transport signals;
   a first optical wavelength division multiplexer communicatively coupled to the first plurality of optical outputs of each of the first host units, wherein the first optical wavelength division multiplexer is configured to combine the optical output signals from the first plurality of optical outputs of the plurality of first host units and output a corresponding first combined optical output over a first optical fiber;
   a second optical wavelength division multiplexer communicatively coupled to the second plurality of optical inputs of each of the second host units, wherein the second optical wavelength division multiplexer is configured to receive the first combined optical output from the first optical fiber and demultiplex the optical output signals and provide them as the optical input signals for the second host units via the second plurality of optical inputs;
   wherein the second optical wavelength division multiplexer is communicatively coupled to the second plurality of optical outputs of each of the second host units, wherein the second optical wavelength division multiplexer is configured to combine the optical output signals from the second plurality of optical outputs of the second host units and output a corresponding second combined optical output over a second optical fiber; and
   wherein the first optical wavelength division multiplexer is communicatively coupled to the first plurality of optical inputs of each of the first host units, wherein the first optical wavelength division multiplexer is configured to receive the second combined optical output from the second optical fiber and demultiplex the optical output signals and provide them as the optical input signals for the plurality of first host units via the first plurality of optical inputs.

2. The network of claim 1, wherein each of the plurality of first host units includes:
   a respective plurality of multiplexer/serializer units configured to multiplex/serialize downlink signals derived from the downlink analog radio frequency signals or the downlink digital radio frequency signals from the one or more base station related nodes; and a respective plurality of demultiplexer/deserializer units configured to demultiplex/deserialize uplink signals derived from the plurality of optical input signals received via the first plurality of optical inputs;

wherein each of the plurality of second host units includes:

a respective plurality of multiplexer/serializer units configured to multiplex/serialize uplink signals derived from uplink transport signals from one or more remote antenna units; and a plurality of demultiplexer/deserializer units configured to demultiplex/deserialize downlink signals derived from the plurality of optical input signals received via the second plurality of optical inputs.

3. The network of claim 1, wherein each of the plurality of first host units and second host units includes a respective plurality of analog-to-digital converters and a respective plurality of digital-to-analog converters.

4. The network of claim 1, wherein the digital baseband unit data comprises one of CPRI baseband data and OBSAI baseband data.

5. A host-to-host network, comprising:

one or more first host units located at a first end of the network, wherein each of the first host units includes a first multiplexer communicatively coupled between a plurality of first inputs and a first optical transmitter, wherein each of the first host units includes a first demultiplexer communicatively coupled between a first optical receiver and a plurality of first outputs, wherein the one or more first host units are configured to communicate signals with one or more base station related nodes using the plurality of first inputs and the plurality of first outputs;

one or more second host units located at a second end of the network, wherein each of the second host units includes a second demultiplexer communicatively coupled between a second optical receiver and a plurality of second outputs, wherein each of the second host units includes a second multiplexer communicatively coupled between a plurality of second inputs and a second optical transmitter, wherein the one or more second host units are configured to communicate transport signals with one or more remote antenna units using the plurality of second inputs and the plurality of second outputs, wherein each respective remote antenna unit of the one or more remote antenna units is configured to generate amplified, downlink radio frequency signals based on the transport signals received from the one or more second host units and output the amplified, downlink radio frequency signals to one or more antennas coupled to the respective remote antenna unit for radiation via the one or more antennas coupled to the respective remote antenna unit; and one or more optical fibers coupled between the one or more first host units and the one or more second host units.

6. The network of claim 5, wherein the one or more optical fibers includes:

a first optical fiber communicatively coupled between the first optical transmitter and the second optical receiver; and a second optical fiber communicatively coupled between the second optical transmitter and the first optical receiver.

7. The network of claim 5, further comprising:

a first optical wavelength division multiplexer configured to combine optical signals from the first optical transmitter of the one or more first host units and output a corresponding first combined optical output over at least one optical fiber of the one or more optical fibers; and a second optical wavelength division multiplexer configured to receive the first combined optical output from at least one optical fiber of the one or more optical fibers and demultiplex the optical output signals and provide them as the optical input signals to the second optical receiver of the one or more second host units.

8. The network of claim 7, wherein the second optical wavelength division multiplexer is configured to combine optical signals from the second optical transmitter of the one or more second host units and output a corresponding second combined optical output over at least one optical fiber of the one or more optical fibers; and wherein the first optical wavelength division multiplexer is configured to receive the second combined optical output from at least one optical fiber of the one or more optical fibers and demultiplex the optical output signals and provide them as the optical input signals to the first optical receiver of the one or more first host units.

9. The network of claim 5, wherein the plurality of first inputs comprise analog radio frequency inputs, wherein each of the first host units includes a plurality of analog-to-digital converters and a plurality of digital-to-analog converters.

10. The network of claim 5, wherein the plurality of first inputs comprise digital radio frequency inputs, wherein each of the first host units includes a plurality of converters for converting between digital baseband unit data and a different digital data format; and wherein the plurality of second outputs comprise digital radio frequency outputs configured to output digital downlink transport signals, wherein each of the second host units includes a plurality of converters for converting between the different digital data format and a digital format used for the digital downlink transport signals.

11. The network of claim 10, wherein the digital baseband unit data comprises one of CPRI baseband data and OBSAI baseband data.

12. The network of claim 5, wherein the plurality of second outputs comprise analog radio frequency outputs, wherein the plurality of second inputs comprise analog radio frequency inputs, wherein each of the second host units further includes a plurality of analog-to-digital converters and a plurality of digital-to-analog converters.

13. The network of claim 5, wherein the plurality of second outputs comprise digital radio frequency outputs, wherein the plurality of second inputs comprise digital radio frequency inputs configured to input digital uplink transport signals, wherein each of the second host units includes a plurality of converters for converting between a digital format used for the digital uplink transport signals and a different digital data format.

14. The network of claim 13, wherein the digital format used for the digital uplink transport signals comprises one of CPRI baseband data and OBSAI baseband data.

15. A method, comprising:

receiving a first plurality of input signals from one or more base station related nodes at one or more first host units located at a first end of a host-to-host network;

generating a first plurality of optical signals at the one or more first host units based on the first plurality of input signals;
communicating the first plurality of optical signals between the one or more first host units and one or more second host units located at a second end of a host-to-host network via one or more optical fibers;
generating a first plurality of transport signals at the one or more second host units based on the first plurality of optical signals; and
transmitting the first plurality of transport signals to one or more remote antenna units, wherein the remote antenna units are configured to generate amplified, downlink radio frequency signals based on the first plurality of transport signals and output the amplified, downlink radio frequency signals to one or more antennas coupled to the remote antenna units for radiation via the one or more antennas coupled to the remote antenna units.

16. The method of claim 15, further comprising:
multiplexing the first plurality of optical signals to generate a first combined optical signal; and
demultiplexing the first combined optical signal to obtain the first plurality of optical signals.

17. The method of claim 15, further comprising:
receiving a second plurality of transport signals from the one or more remote antenna units at the one or more second host units;
generating a second plurality of optical signals at the one or more second host units based on the second plurality of transport signals from one or more remote antenna units;
communicating the second plurality of optical signals between the one or more second host units and the one or more first host units located via one or more optical fibers;
generating a second plurality of output signals at the one or more first host units based on the second plurality of optical signals;
transmitting the second plurality of output signals to the one or more base station related nodes.

18. The method of claim 17, further comprising:
multiplexing the second plurality of optical signals to generate a second combined optical signal; and
demultiplexing the second combined optical signal to obtain the second plurality of optical signals.

19. A method, comprising:
receiving a plurality of transport signals from one or more remote antenna units at one or more first host units located at a first end of a host-to-host network, wherein each respective remote antenna unit of the one or more remote antenna units is configured to receive uplink radio frequency signals from one or more antennas coupled to the respective remote antenna unit, amplify the uplink radio frequency signals, and generate the transport signals based on the amplified, uplink radio frequency signals;
generating a plurality of optical signals at the one or more first host units based on the plurality of transport signals;
communicating the plurality of optical signals between the one or more first host units and one or more second host units located at a second end of a host-to-host network via one or more optical fibers;
generating a plurality of output signals at the one or more second host units based on the plurality of optical signals; and
transmitting the plurality of output signals from the one or more second host units to one or more base station related nodes.

20. The method of claim 19, further comprising:
multiplexing the plurality of optical signals to generate a combined optical signal; and
demultiplexing the combined optical signal to obtain the plurality of optical signals.

21. A host-to-host network comprising:
a plurality of first host units located at a first end, wherein each of the plurality of first host units is configured to output a plurality of optical output signals via a first plurality of optical outputs and receive a plurality of optical input signals via a first plurality of optical inputs, wherein each of the plurality of first host units is configured to receive downlink analog radio frequency signals or downlink digital radio frequency signals from one or more base station related nodes, wherein each of the plurality of first host units includes:
a plurality of digital inputs configured to receive digital baseband unit data from one or more baseband units; and
a respective plurality of converters for converting between the digital baseband unit data and a different digital data format;
a plurality of second host units located at a second end, wherein each of the plurality of second host units is configured to output a plurality of optical output signals via a second plurality of optical outputs and receive a plurality of optical input signals via a second plurality of optical inputs, wherein each respective second host unit of the plurality of second host units is configured to output downlink transport signals to one or more remote antenna units, wherein each respective remote antenna unit of the one or more remote antenna units is configured to generate downlink radio frequency signals based on the downlink transport signals received from the plurality of second host units and output the downlink radio frequency signals for radiation via one or more antennas coupled to the respective remote antenna unit;
wherein each of the plurality of second host units includes:
a plurality of digital outputs configured to output digital downlink transport signals to the one or more remote antenna units; and
a respective plurality of converters for converting between the different digital data format and a digital format used for the digital downlink transport signals;
a first optical wavelength division multiplexer configured to combine the optical output signals from the first plurality of optical outputs of the plurality of first host units and output a corresponding first combined optical output over a first optical fiber;
a second optical wavelength division multiplexer configured to receive the first combined optical output from the first optical fiber and demultiplex the optical output signals and provide them as the optical input signals for the second host units;
wherein the second optical wavelength division multiplexer is configured to combine the optical output signals from the second plurality of optical outputs of the second host units and output a corresponding second combined optical output over a second optical fiber; and wherein the first optical wavelength division multiplexer is configured to receive the second combined optical output from the second optical fiber and demultiplex the optical output signals and provide them as the optical input signals for the plurality of first host units.

22. The network of claim 21, wherein the digital baseband unit data comprises one of CPRI baseband data and OBSAI baseband data.

23. The network of claim 21, wherein each of the plurality of first host units includes:
- a respective plurality of multiplexer/serializer units configured to multiplex/serialize downlink signals derived from the downlink analog radio frequency signals or the downlink digital radio frequency signals from the one or more base station related nodes; and
- a respective plurality of demultiplexer/deserializer units configured to demultiplex/deserialize uplink signals derived from the plurality of optical input signals received via the first plurality of optical inputs;

wherein each of the plurality of second host units includes:
- a respective plurality of multiplexer/serializer units configured to multiplex/serialize uplink signals derived from uplink transport signals from one or more remote antenna units; and
- a plurality of demultiplexer/deserializer units configured to demultiplex/deserialize downlink signals derived from the plurality of optical input signals received via the second plurality of optical inputs.

* * * * *